(12) United States Patent
Miller

(10) Patent No.: US 12,202,247 B2
(45) Date of Patent: *Jan. 21, 2025

(54) PRINTING UTILIZING A VIRTUAL MASK

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,191

(22) Filed: Oct. 11, 2023

(65) Prior Publication Data
US 2024/0034051 A1    Feb. 1, 2024

Related U.S. Application Data

(63) Continuation of application No. 17/061,471, filed on Oct. 1, 2020, now Pat. No. 11,813,839, which is a
(Continued)

(51) Int. Cl.
| | |
|---|---|
| B29C 64/386 | (2017.01) |
| A43B 23/04 | (2006.01) |
| A43D 8/16 | (2006.01) |
| A43D 95/14 | (2006.01) |
| B29C 48/18 | (2019.01) |
| B29C 64/124 | (2017.01) |
| B41F 17/38 | (2006.01) |
| B41J 3/407 | (2006.01) |
| B41J 11/00 | (2006.01) |

(Continued)

(52) U.S. Cl.
CPC ............ *B41F 17/38* (2013.01); *A43B 23/04* (2013.01); *A43D 8/16* (2013.01); *A43D 95/14* (2013.01); *B29C 48/18* (2019.02); *B29C 64/124* (2017.08); *B29C 64/386* (2017.08); *B41J 3/4073* (2013.01); *B41J 3/4078* (2013.01); *B41J 11/008* (2013.01); *D06M 23/16* (2013.01); *D06N 7/0092* (2013.01); *B29C 64/112* (2017.08); *B33Y 10/00* (2014.12); *B33Y 30/00* (2014.12); *D06Q 1/00* (2013.01)

(58) Field of Classification Search
CPC ...... B41J 3/4078; B41J 3/4073; B41J 11/008; B29C 64/386; B29C 64/393
See application file for complete search history.

(56) References Cited

U.S. PATENT DOCUMENTS

| | | |
|---|---|---|
| 5,121,329 A | 6/1992 | Crump |
| 7,916,340 B2 | 3/2011 | Sasaki |
| (Continued) | | |

FOREIGN PATENT DOCUMENTS

| | | |
|---|---|---|
| CN | 101952126 A | 1/2011 |
| CN | 104428126 B | 5/2016 |
| (Continued) | | |

OTHER PUBLICATIONS

International Search Report and Written Opinion, issued Jun. 8, 2017, for corresponding International Patent Application No. PCT/US2017/019166, 11 pages.

*Primary Examiner* — Timothy Kennedy
(74) *Attorney, Agent, or Firm* — Klarquist Sparkman, LLP

(57) ABSTRACT

A method and apparatus for printing on an article are disclosed. An embodiment of a method may include the generation of a virtual mask that can designate areas for printing and/or designate areas to exclude from printing. A method may include utilization of the virtual mask during either 2D or 3D printing such that a print design is printed in areas designated for printing by the virtual mask.

20 Claims, 16 Drawing Sheets

Related U.S. Application Data continuation of application No. 16/455,566, filed on Jun. 27, 2019, now Pat. No. 10,800,160, which is a continuation of application No. 15/063,730, filed on Mar. 8, 2016, now Pat. No. 10,357,962.

(51) Int. Cl.
*D06M 23/16* (2006.01)
*D06N 7/00* (2006.01)
*B29C 64/112* (2017.01)
*B33Y 10/00* (2015.01)
*B33Y 30/00* (2015.01)
*D06Q 1/00* (2006.01)

(56) References Cited

U.S. PATENT DOCUMENTS

| | | | |
|---|---|---|---|
| 8,169,646 B2 | 5/2012 | Sasaki | |
| 8,422,067 B2 | 4/2013 | Nishimachi | |
| 8,538,163 B2 | 9/2013 | Moesle | |
| 8,695,495 B2 | 4/2014 | Hashimoto | |
| 8,746,997 B2 | 6/2014 | Takeuchi | |
| 2008/0147219 A1 | 6/2008 | Jones et al. | |
| 2009/0192874 A1 | 7/2009 | Powles | |
| 2014/0020192 A1 | 1/2014 | Jones et al. | |
| 2014/0026769 A1 | 1/2014 | Miller | |
| 2014/0029030 A1 | 1/2014 | Miller | |
| 2014/0300676 A1 | 10/2014 | Miller et al. | |
| 2015/0139960 A1 | 5/2015 | Turney et al. | |
| 2015/0321434 A1 | 11/2015 | Sterman et al. | |
| 2016/0023403 A1 | 1/2016 | Ramos et al. | |
| 2016/0236414 A1 | 8/2016 | Reese et al. | |

FOREIGN PATENT DOCUMENTS

| | | |
|---|---|---|
| CN | 105365215 B | 2/2018 |
| DE | 102010025159 | 12/2011 |
| EP | 1151778 A1 | 11/2001 |
| EP | 2213462 | 1/2010 |
| JP | 2009-037128 | 2/2009 |
| WO | WO 2015/112998 A1 | 7/2015 |

| IMAGE DATA | | | |
|---|---|---|---|
| # | PIXEL LOCATION | COLOR VALUE | PRINT AREA (Y/N) |
| 502 | X=115,450 Y=124,700 | (250, 165, 0) | Y |
| 504 | X=115,450 Y=124,701 | (250, 165, 0) | Y |
| 506 | X=115,450 Y=124,702 | (250, 165, 0) | Y |
| 508 | X=115,450 Y=124,703 | (40, 40, 40) | N |
| 510 | X=115,450 Y=124,703 | (40, 40, 40) | N |

FIG. 6

PRINTING UTILIZING A VIRTUAL MASK

CROSS REFERENCE TO RELATED APPLICATIONS

This application is a continuation of U.S. patent application Ser. No. 17/061,471, filed Oct. 1, 2020, which is a continuation of U.S. patent application Ser. No. 16/455,566, filed Jun. 27, 2019, now U.S. Pat. No. 10,800,160, which is a continuation of U.S. patent application Ser. No. 15/063,730, filed Mar. 8, 2016, now U.S. Pat. No. 10,357,962. The prior applications are incorporated herein by reference in their entirety.

BACKGROUND

The present embodiments relate generally to two-dimensional printing and three-dimensional printing systems and methods.

Three-dimensional printing systems and methods may be associated with various technologies including fused deposition modeling (FDM), electron beam freeform fabrication (EBF), and selective laser sintering (SLS), as well as other kinds of three-dimensional printing technologies.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 6 is an embodiment of a matrix providing information about a portion of the digital representation of FIG. 5;

DETAILED DESCRIPTION

Figure 1:
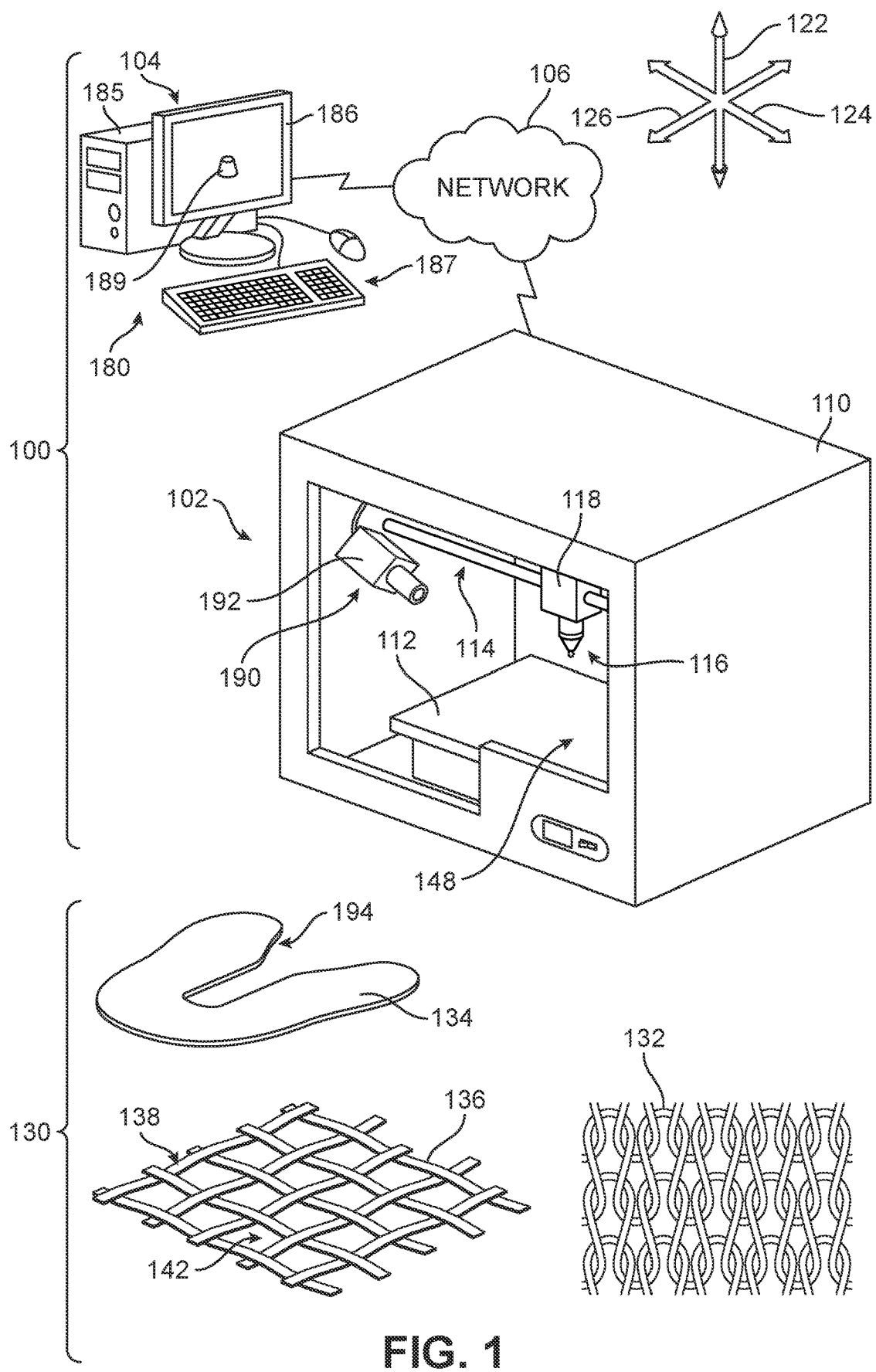
FIG. 1 is a schematic view of an embodiment of components of a three-dimensional printing system as well as several articles that may be used with the three-dimensional printing system.

Embodiments can include provisions to facilitate the printing of various designs, patterns, and structures on a surface. In one embodiment, the present disclosure is directed to a method of printing on an article, the method comprising: obtaining data regarding the article using a sensor system, forming a digitized image of the article, where the digitized image comprises a plurality of pixels, and where the plurality of pixels includes a first pixel and the first pixel represents a specific area of the article. Furthermore, the method includes the step of classifying the first pixel as belonging to a first category or a second category; discharging a print material on the article using a printing system if the first pixel belongs to the first category; and preventing the specific area of the article represented by the first pixel from receiving the print material if the first pixel belongs to the second category.

In another embodiment, the present disclosure is directed to a method of printing on an object using a virtual mask, the method comprising: aligning the object within a printing system using a sensor system, obtaining data regarding the object using at least one image capture device, and registering the image to form a virtual representation of the object. Furthermore, the method comprises generating a virtual mask, where the virtual mask classifies different regions of the virtual representation as belonging to either a print area or to an area where printing is prohibited, and then utilizing the virtual mask in conjunction with the printing system to exclude printing upon the different portions of the object represented by regions classified in the area where printing is prohibited.

In another embodiment, the present disclosure is directed to an apparatus for printing on an article, the apparatus comprising a housing, where the housing includes a base disposed along the bottom of the housing, and where the housing is configured to receive the article. The apparatus further comprises a nozzle assembly configured to discharge a print material and a sensor system, where the sensor system includes an image capture device. The apparatus also includes a computing system, where the computing system is configured to classify areas of the article as a print area or an area prohibited from printing. The apparatus is configured to print a print design on the areas of the article classified as a print area, and the apparatus is also configured to exclude printing of the print design on the areas of the article classified as an area that is prohibited from printing.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

FIG. 1 is a schematic view of an embodiment of a three-dimensional printing system 100, also referred to simply as printing system 100 hereafter. FIG. 1 also illustrates several exemplary articles 130 that may be used with printing system 100. Referring to FIG. 1, printing system 100 may further comprise a printing device 102, a computing system 104, and a network 106.

For consistency and convenience, directional adjectives are employed throughout this detailed description corresponding to the illustrated embodiments. The term "longitudinal," as used throughout this detailed description and in the claims, refers to a direction extending a length of a component. The term "longitudinal axis," as used throughout this detailed description and in the claims, refers to an axis oriented in a longitudinal direction.

The term "lateral direction," as used throughout this detailed description and in the claims, refers to a side-to-side direction extending a width of a component. For example, the lateral direction may extend between a medial side and a lateral side of an article of footwear, with the lateral side of the article of footwear being the surface that faces away from the other foot, and the medial side being the surface that faces toward the other foot. The term "lateral axis," as used throughout this detailed description and in the claims, refers to an axis oriented in a lateral direction.

The term "horizontal," as used throughout this detailed description and in the claims, refers to any direction substantially parallel with the longitudinal direction, the lateral direction, and all directions in between. In cases where a component is placed on the ground, a horizontal direction may be parallel with the ground.

The term "vertical," as used throughout this detailed description and in the claims, refers to a direction generally perpendicular to both the lateral and longitudinal directions, along a vertical axis. For example, in cases where a component is flat on a ground surface, the vertical direction may extend from the ground surface upward.

In the embodiments shown in the figures, printing system 100 may be associated with fused filament fabrication (FFF), also referred to as fused deposition modeling. In the embodiment shown in FIG. 1, printing device 102 of printing system 100 may use fused filament fabrication to produce three-dimensional parts. An example of a printing device using fused filament fabrication (FFF) is disclosed in U.S. Pat. No. 5,121,329 to Crump, issued Jun. 9, 1992, and titled "Apparatus and Method for Creating Three-Dimensional Objects," which application is herein incorporated by reference and referred to hereafter as the "3D Objects application." Embodiments of the present disclosure can make use of any of the systems, components, devices, and methods disclosed in the 3D Objects application. Printing device 102 may include a housing 110 that supports various systems, devices, components, or other provisions that facilitate the three-dimensional printing of objects (e.g., parts, components, or structures). Although the exemplary embodiment depicts a particular rectangular box-like geometry for housing 110, other embodiments could use any housing having any geometry and/or design. The shape and size of housing 110 could be varied according to factors including a desired footprint for the device, the size and shape of parts that may be formed within printing device 102, as well as possibly other factors. It will be understood that housing 110 could be open (e.g., provide a frame with large openings) or closed (e.g., with glass or panels of solid material and a door).

In some embodiments, printing device 102 may include provisions to retain or hold a printed object (or a component supporting the printed object). In some embodiments, printing device 102 may include a table, platform, tray, or similar component to support, retain, and/or hold a printed object or an object onto which printed material is applied. In the embodiment of FIG. 1, printing device 102 includes a tray 112. In some embodiments, tray 112 may be fixed in place and act as a stable base. In other embodiments, however, tray 112 could move. For example, in some cases, tray 112 may be configured to translate within housing 110 in a horizontal direction (e.g., front-back and/or left right with respect to housing 110) as well as a vertical direction (e.g., up-down within housing 110). Moreover, in some cases, tray 112 may be configured to rotate and/or tilt about one or more axes associated with tray 112. Thus, it is contemplated that in at least some embodiments, tray 112 may be moved into any desired relative configuration with a nozzle or print head of printing device 102. In other embodiments, printing device 102 may not include a tray 112. In some embodiments, tray 112 may be curved, irregularly shaped, or shaped to provide a customized platform upon which an article or object may be placed or secured. In some embodiments, printing device 102 may include an open space or cavity formed within tray 112.

In some embodiments, printing device 102 may include one or more systems, devices, assemblies, or components for delivering a printed material (or printed substance) to a target location. Target locations could include the surface of tray 112, a surface or portion of a partially printed structure, and/or a surface or portion of a non-printed structure or component, such as a textile or other article. Provisions for delivering printed materials may include, for example, print heads and nozzles. In the embodiment of FIG. 1, printing device 102 includes a nozzle assembly 116.

Nozzle assembly 116 may comprise one or more nozzles that deliver a printed material to a target location. For purposes of clarity, the exemplary embodiment of FIG. 1 depicts a single nozzle 118 of nozzle assembly 116. However, in other embodiments, nozzle assembly 116 could be configured with any number of nozzles, which could be arranged in an array or any particular configuration. In embodiments comprising two or more nozzles, the nozzles could be configured to move together and/or independently.

Nozzle 118 may be configured with a nozzle aperture (not shown) that can be opened and/or closed to control the flow of material exiting from nozzle 118. Specifically, the nozzle aperture may be in fluid communication with a nozzle channel that receives a supply of material from a material source within printing device 102. Some examples of materials that may be received or used are disclosed in U.S. Patent Publication Number 2017/0129176 to Sterman et al., published May 11, 2017 (U.S. patent application Ser. No. 14/935,731, filed Nov. 9, 2015), and titled "Tack and Drag Printing Method," which application is herein incorporated by reference in its entirety, and is hereinafter referred to as the "Tack and Drag case." Other examples include aqueous inks, dye-based inks, pigment-based inks, solvent inks, UV-curable inks, dye sublimation inks, and other print materials.

In some embodiments, a worm-drive may be used to push the filament into nozzle 118 at a specific rate (which may be varied to achieve a desired volumetric flow rate of material from nozzle 118). In other embodiments, a worm-drive is omitted. For example, the material may be pulled from nozzle 118 using an actuating system. It will be understood that in some cases, the supply of material could be provided at a location near nozzle 118 (e.g., in a portion of nozzle assembly 116), while in other embodiments the supply of material could be located at some other location of printing device 102 and fed via tubes, conduits, or other provisions, to nozzle assembly 116.

For purposes of this description, articles 130 may encompass a wide variety of objects, components, materials, and/or shapes that are flat or include a three-dimensional geometry. Articles 130 may have portions that include curves, bumps, gaps, openings, and/or varying thickness, such as shown in articles 130 of FIG. 1. For example, an article may have regions or portions that are flat, smooth, level, or even, with relatively little thickness. However, the same article may also include uneven portions with surfaces that deviate from being flat for some or all of its length or area. In FIG. 1, articles 130 include an upper 134 for an article of footwear, a knit structure 132, and a woven pattern 136. In other embodiments, articles can comprise regular, geometric curves such as those associated with circles, triangles, squares, and other geometric shapes, and/or they may also be irregular, for example in articles shaped to accommodate or include a particular uneven configuration. For example articles 130 such as woven pattern 136 can comprise one more tangible portions 138 and/or one or more apertures 142. For purposes of this disclosure, a tangible portion may be a material portion that can receive a print material. Thus, tangible portions 138 may be distinct from voids, spaces, gaps, etc. (for example, apertures 142), which cannot receive a print material. Furthermore, it should be understood that the use of the term "aperture" herein represents any one or more of voids, spaces, gaps, recesses, and/or any other type of intangible portions, etc. In some embodiments, apertures 142 may be surrounded by or disposed adjacent to one or more tangible portions 138 of articles 130. The relationship between tangible portions 138 and apertures 142 will be discussed in further detail below.

As will be described below, printing system 100 can include provisions for facilitating the alignment of a printed design or graphic onto an article. In some embodiments, it may be useful to provide a user with a way of aligning an article or object with printing system 100 so as to ensure a graphic is printed in the desired portion of the article. In particular, printing system 100 may include provisions for programming the orientation of an article with print device 102 in such a way as to accommodate articles of various types, shapes, curves, and sizes. Thus, in some cases, printing system 100 may include provisions for pre-aligning the article (for example, with registration markers within the system). In some embodiments, the object may be aligned with tray 112 and/or nozzle 118. In one embodiment, the object may be automatically aligned within printing system 100 using techniques known in the art.

In some embodiments, nozzle assembly 116 is associated with an actuating system 114. Actuating system 114 may include various components, devices, and systems that facilitate the motion of nozzle assembly 116 within housing 110. In particular, actuating system 114 may include provisions to move nozzle assembly 116 in any horizontal direction (including but not limited to a longitudinal direction 124 and a lateral direction 126) and/or a vertical direction 122 to facilitate depositing or discharging a material so as to form a three-dimensional object or to print along a three-dimensional or curved surface. To this end, embodiments of actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another.

In some embodiments, an actuating system can be configured to move a nozzle in one or more directions. In some embodiments, an actuating system could move a nozzle in a single linear direction. In other embodiments, an actuating system could move a nozzle in at least two perpendicular directions. In still other embodiments, an actuating system could move a nozzle in three perpendicular directions. Of course, while the exemplary embodiment depicts an actuating system capable of moving a nozzle through three independent x-y-z or Cartesian directions, other embodiments may be configured to move a nozzle in three independent directions associated with a non-Cartesian coordinate system (e.g., a spherical coordinate system or a cylindrical coordinate system). Still further, in other cases an actuating system could move a nozzle through three different directions that may not be orthogonal (e.g., directions of an oblique coordinate system).

Figure 2:
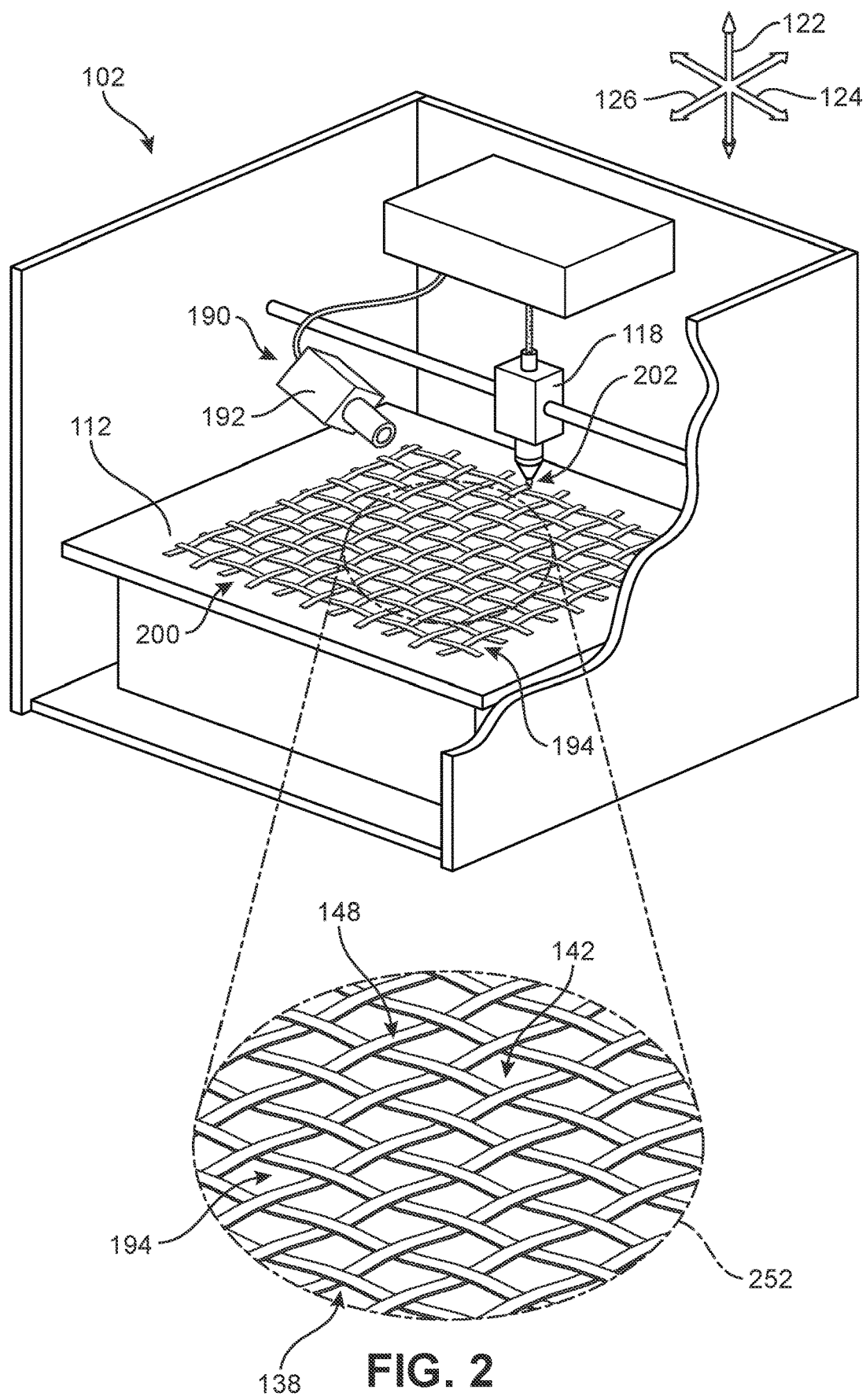
FIG. 2 is a schematic view of an embodiment of a printing device and an article.

For purposes of this discussion, a print surface may be associated with the surface where a nozzle is printing. For example, in cases where nozzle 118 prints directly onto tray 112, the print surface is associated with a surface of tray 112. In the embodiment of FIG. 1, print surface 148 is illustrated as the side of tray 112 that faces upward toward nozzle assembly 116. However, it should be noted that in other embodiments, print surface 148 may comprise the surface or side of an article or object that is printed upon by nozzle 118, as shown in FIG. 2. Print surface 148 may be generally flat, or it may be substantially curved and include contours. In one embodiment, print surface 148 may be the side or surface of an object or article that is generally normal to first direction 160. Thus, print surface 148 may refer to the surface of an article that is attached to a printing material such as a composite yarn or other material extruded or otherwise discharged or emitted from nozzle 118.

As shown in FIGS. 1 and 2, in different embodiments, printing system 100 can include a sensor system 190. However, it should be understood that in some embodiments, sensor system 190 may be independent from printing system 100. In other words, sensor system 190 may be a separate system that is used in conjunction with printing system 100. Sensor system 190 may include various components, devices, and systems that facilitate the detection of various features of articles 130 within housing 110. Although the exemplary embodiment depicts a particular camera component representation for sensor system 190, other embodiments could use any system having any geometry and/or design. The shape and size of the sensor system could vary according to factors including the type of article being printed on, the size and shape of parts that may be formed within printing device 102, the arrangement of housing 110, as well as possibly other factors.

In particular, sensor system 190 may include provisions to detect, map, or otherwise identify the presence of various surface types, such as the regions associated with apertures 142 and tangible portions 138. Sensor system 190 may further include an imaging device 192, (such as a camera or other image capture device), which may move in any horizontal direction and/or vertical direction 122 to facilitate the position imaging device 192 within housing 110. The image capture device may record images of the object and/or generates data representing the object in some embodiments.

To this end, embodiments of sensor system 190 may include one or more tracks, rails, and/or similar provisions to reposition imaging device 192 at various positions and/or orientations within housing 110. In other words, sensor system 190 may include provisions for aligning articles or objects such that appropriate recordings may be obtained.

Embodiments may also include any kinds of motors, such as a stepper motor or a servo motor that can move objects or imaging device 192 along a track or rail, and/or to move one or more tracks or rails relative to one another. For purposes of clarity, imaging device 192 is shown in FIGS. 1-2 in isolation from any components that could be used to move imaging device 192. In some embodiment, imaging device 192 or other components of sensor system 190 may not be mobile and may instead be stationary within housing 110.

It should be noted that portions of sensor system 190 may be positioned in various locations within printing system 100 in order to provide the necessary data capture and feature detection. For example, imaging device 192 could move from one location to another within printing system 100 in order to record data sufficient for generating a virtual representation. In different embodiments, there may be multiple image capture devices, which may be used together to synthesize a composite image. In one embodiment, there may be a 2-5 image capture devices; in other embodiments, there may be more than five image capture devices, arranged throughout printing system 100. Thus, the data captured and/or generated by the image capture devices may be synthesized into a composite image through an image registration process, where the resulting image can be made up of a first image portion, a second image portion, a third image portion, etc. obtained from multiple sources.

For purposes of this disclosure, image registration is the process of transforming sets of data into one coordinate system. Thus, in one embodiment, image registration is the process of aligning two or more images of the same scene. The images or data may be obtained by one source (e.g., a single camera taking images from various locations), or by multiple sources. In some embodiments, this process involves designating one image as the reference (also called the reference image or the fixed image), and applying geometric transformations to the other images so that they align with the reference. A geometric transformation can map locations in one image to new locations in another image.

In some embodiments, components associated with sensor system 190 may be specifically adapted to secure articles 130 in a fixed position or orientation. For example, some embodiments may include various kinds of mounting devices, harnesses, temporary adhesives, or other provisions that may temporarily fix or hold the position of an article relative to housing 110. Such provisions may help precisely orient a specific portion of an article towards nozzle 118 (and correspondingly towards other components of printing device 102) or sensor system 190. For example, some embodiments could utilize a harness that fixes the orientation and position of an article over tray 112 so that imaging device can capture or scan data from along any desired portion of an article, such as upper 134 for an article of footwear. These provisions may also reduce the tendency of an article to move or jostle as the position of tray 112 is adjusted, or nozzle 118 extrudes or releases a print material onto articles 130.

Thus, in some embodiments, articles 130 may be scanned or otherwise examined or inspected in housing 110 before and/or during printing. It should be noted that actuating system 114 and sensor system 190 may be operated simultaneously or independently during use of printing system 100. In addition, actuating system 114 and sensor system 190 may be connected in such a way so as to allow both to operate in conjunction with one another during printing. As discussed above, printing system 100 can include provisions to control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. Further, it should be understood that in some embodiments, computing system 104 may be independent from printing system 100. In other words, computing system 104 may be a separate system that is used in conjunction with printing system 100.

In some embodiments, computing system 104 may include one or more servers. In some cases, a print server may be primarily responsible for controlling and/or communicating with printing device 102, while a separate computer (e.g., desktop, laptop, or tablet) may facilitate interactions with a user. Computing system 104 can also include one or more storage devices including but not limited to magnetic, optical, magneto-optical, and/or memory, including volatile memory and non-volatile memory.

In the exemplary embodiment of FIG. 1, computing system 104 may comprise a central processing device 185, a viewing interface 186 (e.g., a monitor or screen), input devices 187 (e.g., keyboard and mouse), and software 180. While software 180 is represented in FIG. 1 as being stored in computing system 104, it should be understood that in other embodiments, software 180 may be accessed from other locations. In some embodiments, software 180 may be used for designing a computer-aided design ("CAD") representation 189 of a printed structure. In at least some embodiments, the CAD representation 189 of a printed structure may include not only information about the geometry of the structure, but also information related to the materials required to print various portions of the structure.

In different embodiments, software 180 may also be used to facilitate interaction between computing system 104 and printing device 102, including sensor system 190. In some embodiments, for example, computing system 104 may include image edge detection software or another type of classification software, a processor configured with the software to receive an image, and a process of decomposing and/or determining the areas of the image comprising tangible portions 138 relative to non-tangible portions (e.g., apertures 142). For purposes of this description, this operation or process may also be referred to as image discrimination. In one embodiment, printing system 100 may also generate a virtual mask to identify regions that will be excluded from printing. Virtual masks will be discussed further with respect to FIGS. 5-19.

According to one embodiment, imaging device 192 may provide a real-time video input source, including real-time video feed or other real-time data. Alternatively, imaging device 192 may provide pre-recorded video data. According to another embodiment, imaging device 192 may provide heat detection information, including infrared imaging data and/or other heat detection information. One of ordinary skill in the art will readily appreciate that other imaging data may be gathered and processed at various points during the image capture process. Thus, in different embodiments, imaging device 192 may be utilized to capture information from various objects. According to another embodiment, printing system 100 may recognize any video source and any resolution that is sufficiently clear to recognize the images. One skilled in the art will readily appreciate that various types of imaging devices may be implemented.

In other embodiments, computing system 104 can also include provisions for determining the edges of an object such as articles 130. In one embodiment, an edge 194 is a portion of articles 130 where there is a change in the brightness of the image. For example, images taken by imaging device 192 may be processed such that tangible portions 138 are separated or distinguished from the background in real-time analysis. In another embodiment, the processing may occur after the image is captured. Therefore, various edge detection or other technologies for identifying different aspects of the image can be utilized. Some embodiments may make use of the features described in U.S. Patent Publication Number 2009/0192874 to Powles et al., published Jul. 30, 2009 and titled "Systems and methods for targeted advertising," the disclosure of which is herein incorporated by reference in its entirety. Other embodiments may make use of the features described in U.S. Pat. No. 8,538,163 to Moesle et al., filed Sep. 29, 2010, and titled "Method and system for detecting edges within an image," the disclosure of which is herein incorporated by reference in its entirety.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems and firewalls. In some cases, network 106 may be a wireless network that facilitates wireless communication between two or more systems, devices, and/or components of printing system 100. Examples of wireless networks include, but are not limited to: wireless personal area networks (including, for example, Bluetooth), wireless local area networks (including networks utilizing the IEEE 802.11 WLAN standards), wireless mesh networks, and mobile device networks, as well as other kinds of wireless networks. In other cases, network 106 could be a wired network including networks whose signals are facilitated by twisted pair wires, coaxial cables, and optical fibers. In still other cases, a combination of wired and wireless networks and/or connections could be used.

It will be understood that for purposes of illustration, the components, devices and systems of printing system 100 are shown schematically in FIG. 1. It will therefore be appreciated that embodiments may include additional provisions not shown, including specific parts, components, and devices that facilitate the operation of actuating system 114, sensor system 190, computing system 104, network 106, and nozzle assembly 116. For example, actuating system 114 is shown schematically as including several tracks or rails, but the particular configuration and number of parts comprising actuating system 114 may vary from one embodiment to another.

Printing system 100 may be operated as follows to form one or more printed images using a two-dimensional (2D) printing process in some embodiments. For purposes of this disclosure, 2D printing refers to the rendering of 2D images on a substrate or other surface. In other embodiments, printed structures may be formed using a three-dimensional (3D) printing, or additive, process.

Although some of the 3D printing embodiments shown in the figures depict a system using filament fused fabrication printing technologies, it will be understood that still other embodiments could incorporate one or more different 3D printing technologies. For example, printing system 100 may use a tack and drag print method, as described in the Tag and Drag case. Moreover, still other embodiments could incorporate a combination of filament fused fabrication and another type of 2D or 3D printing technique to achieve desired results for a particular printed structure or part. It should be understood that the techniques described herein may also utilize 2D printer systems (e.g., inkjets, etc.) and/or 3D (e.g., additive manufacturing) and processes.

In different embodiments, printing device 102 may use a variety of different materials for forming 2D images and/or 3D parts, including, but not limited to: inks, thermoplastics (e.g., polyactic acid and acrylonitrile butadiene styrene), high density polyethylene, eutectic metals, rubber, clays (including metal clays), Room Temperature Vulcanizing silicone (RTV silicone), and porcelain, as well as possibly other kinds of materials known in the art. In embodiments where two or more different printed or extruded materials are used to form a part, any two or more of the materials disclosed above could be used.

In some cases, computing system 104 may be used to design a print pattern or a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

As discussed above, in some embodiments, printed structures may be printed directly to one or more articles 130. The term "articles" is intended to include both articles of footwear (e.g., shoes) and articles of apparel (e.g., shirts and pants), as well as various other objects. While the disclosed embodiments are described in the context of textiles, the disclosed embodiments may further be equally applied to any article of apparel, clothing equipment, or other objects. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel," "article of footwear," and "footwear" may also refer to a textile, a natural fabric, a synthetic fabric, a knit, a woven material, a nonwoven material, a mesh, a leather, a synthetic leather, a polymer, a rubber, and a foam.

Furthermore, objects made of other non-textile materials may also provide print surface 148 in printing system 100. For example, articles 130 may also include an article of footwear, a helmet, a glove, or other articles. Specifically, in some cases, printing device 102 may be capable of printing onto the surfaces of various materials such as a textile, a natural fabric, a synthetic fabric, a knit, a woven material, a nonwoven material, a mesh, a leather, a synthetic leather, a polymer, a rubber, and a foam, or any combination thereof. For example, the disclosed methods may include printing a resin, acrylic, thermoplastic material, or ink material onto a fabric, for example, a knit material, where the material is adhered or bonded to the fabric and where the material does not generally delaminate when flexed, rolled, worked, or subjected to additional assembly processes or steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, foam, and combinations thereof.

In some embodiments, the horizontal or vertical position of articles 130 may be adjusted using sensor system 190. Sensor system 190 may operate in conjunction with computing system 104 to provide greater automation to printing system 100.

As previously mentioned, nozzle 118 is configured to extrude or discharge various materials. For example, as shown, nozzle 118 may extrude a print material 202 such as a substantially elongated continuous composite yarn, or nozzle 118 may extrude multiple elongated continuous composite yarn segments. For example, in some embodiments, print material 202 may include a melt resistant material and/or a heat moldable material, or another type of ink. As used herein, heat moldable material includes thermoplastic. In some embodiments, a composite yarn is at least partially formed of thermoplastic.

However, it should be noted that in other embodiments, print material 202 may be discharged or otherwise emitted via nozzle 118 in the form of droplets. In some cases, droplets may comprise the print materials (e.g., inks) described earlier. One of ordinary skill in the art will recognize that the form of the droplets may vary depending on the actual material ejected or otherwise emitted from nozzle 118. In some embodiments, the droplets may thus be any viscosity liquid material, or even a semi-solid material. Consistent with an embodiment, the droplets may be any desired material or phase of material suitable for use in printing system 100.

The methods illustrated may be implemented on various devices, may utilize various materials, and use different types of print surfaces. Accordingly, the exemplary methods illustrated in FIGS. 1-19 are for illustrative purposes only. In some embodiments, the printing can occur over articles 130 that have been previously manufactured or fabricated, or partially manufactured, and printing can occur post-manufacture. This can allow customization of articles 130 to be processed more quickly, as well as more cost-efficiently. Furthermore, printing system 100 can allow formation of designs that encompass multiple surfaces and curves of article 130, including surfaces comprising varying materials, and can provide more seamless design appearance.

Figure 3:
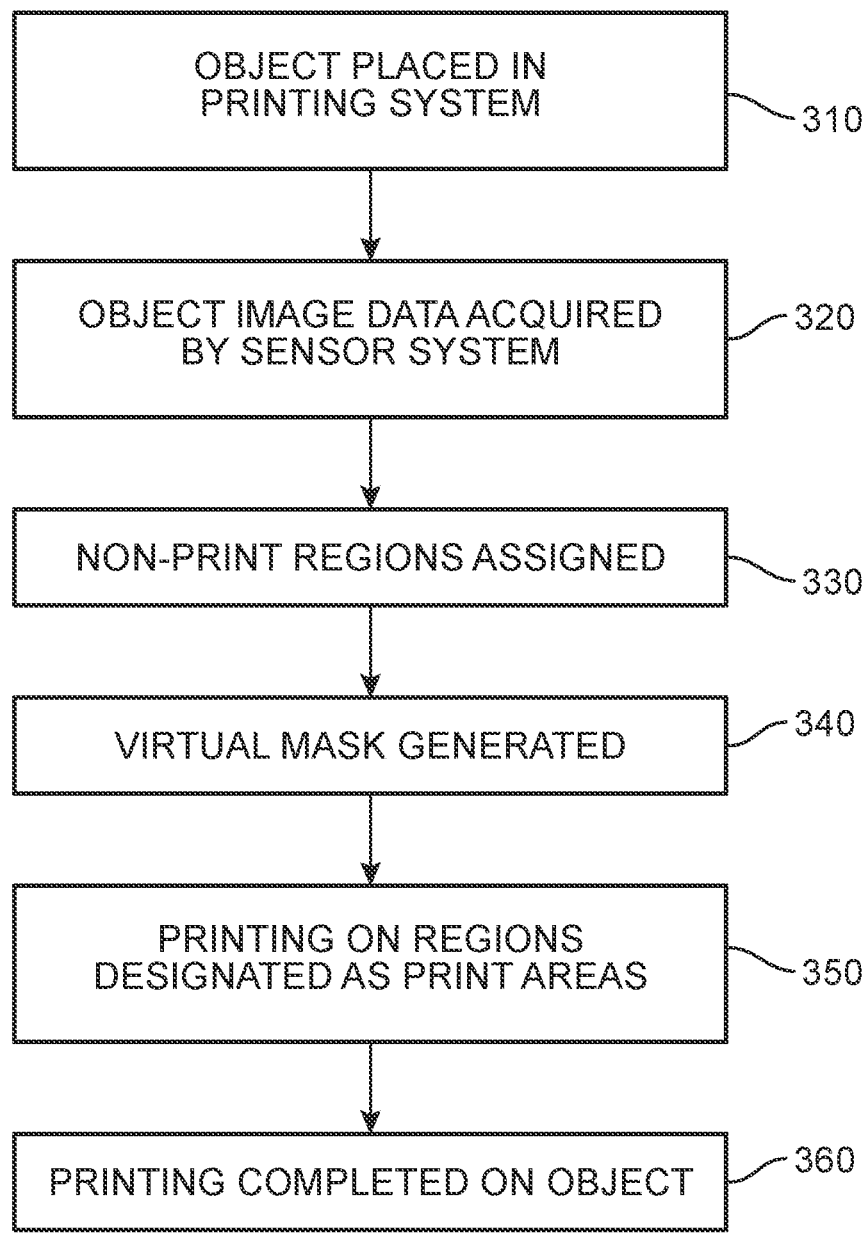
FIG. 3 is a flow diagram outlining the steps of an embodiment of the printing process.

As a general introduction to some of the embodiments described herein, a flow diagram is provided in FIG. 3. Before printing, an article may be placed onto tray or may be otherwise secured in the housing in a first step 310. The object may then be scanned or otherwise have data gathered regarding the object by the sensor system in a second step 320. In a third step 330, the data may be used by the computing system to examine the object and determine areas to exclude from printing. In a fourth step 340, a virtual mask (described in further detail below) may be generated by the computing system. Once the printing process is initiated (by a user, for example), the printing device may begin depositing material onto the article. The printing system may employ the virtual mask to limit printing to areas that have not been excluded by the virtual mask in a fifth step 350. In a sixth step 360, printing is completed on the object.

Further detail on this process is provided below, with respect to FIGS. 4-19. For purposes of convenience some components of printing system 100 are not shown in the following figures. Thus, it should be understood that FIGS. 4-5, and 7-17 are for purposes of illustration only, and the components described above with respect to FIGS. 1 and 2 may be included or referred to in the following description while not illustrated in the figures.

Figure 4:
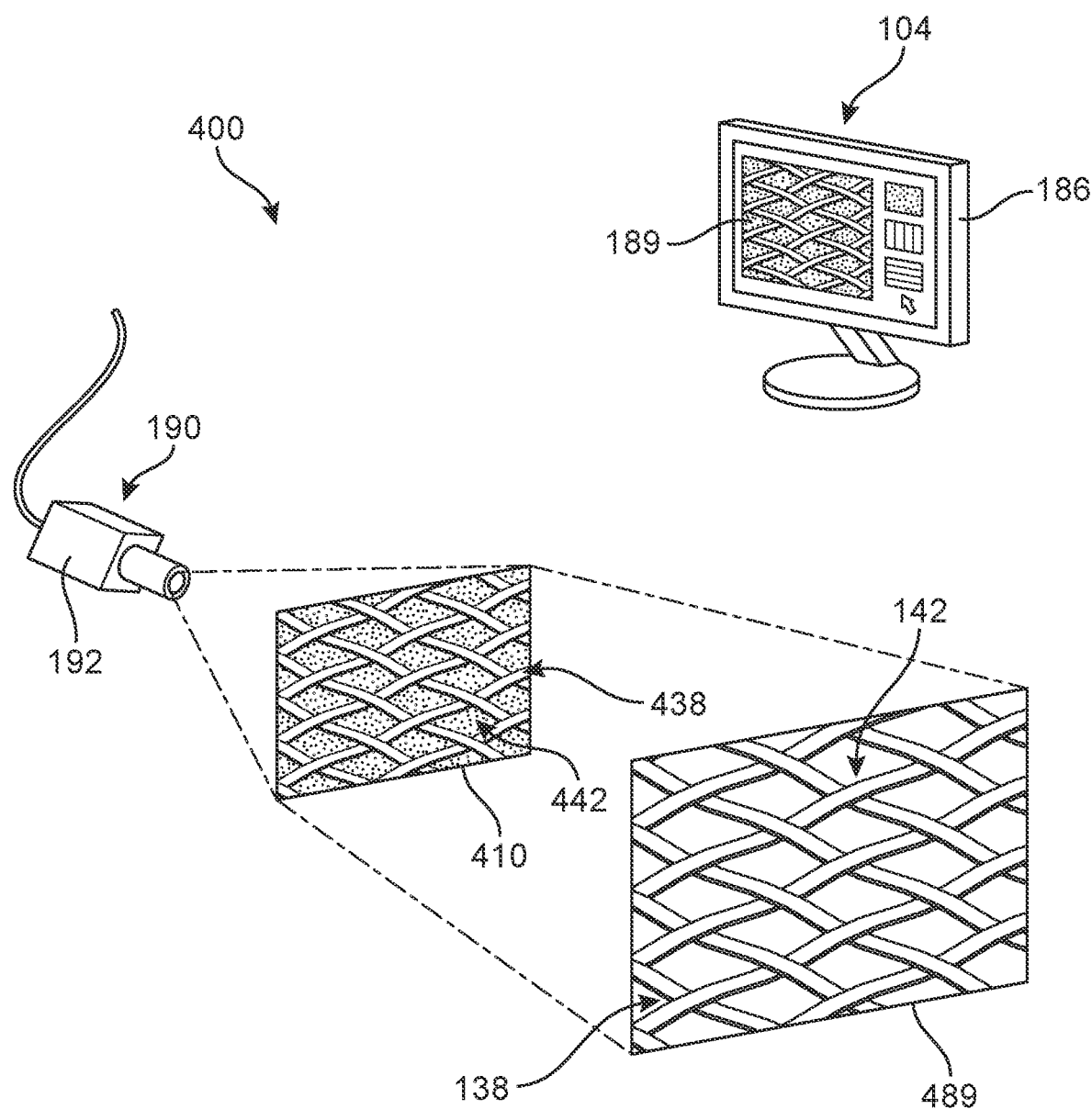
FIG. 4 is an isometric view of an embodiment of a portion of a sensor system, a portion of a computing system, and an article.

In FIG. 4, one embodiment of the image capture process 400 is depicted. In some embodiments, an initial image capture 489 of at least a portion of an article or object may be recorded by imaging device 192 of sensor system 190. As shown in FIG. 4, initial image capture 489 represents a portion of an article (not shown), where the article includes apertures 142 and tangible portions 138. Processing may be performed using computing system 104 in some embodiments, as depicted by CAD representation 189 shown on viewing interface 186. In one embodiment, initial image capture 489 may include obtaining data regarding the object and forming a virtual representation of the article.

In one embodiment, computing system 104 may perform various edge detection and discrimination processes, as described above. For example, computing system 104 may receive the image or data, apply an edge detection process, and decompose the image or virtual representation of the object into one or more regions. In one embodiment, the multiple regions each represent different portions of the object.

Figure 5:
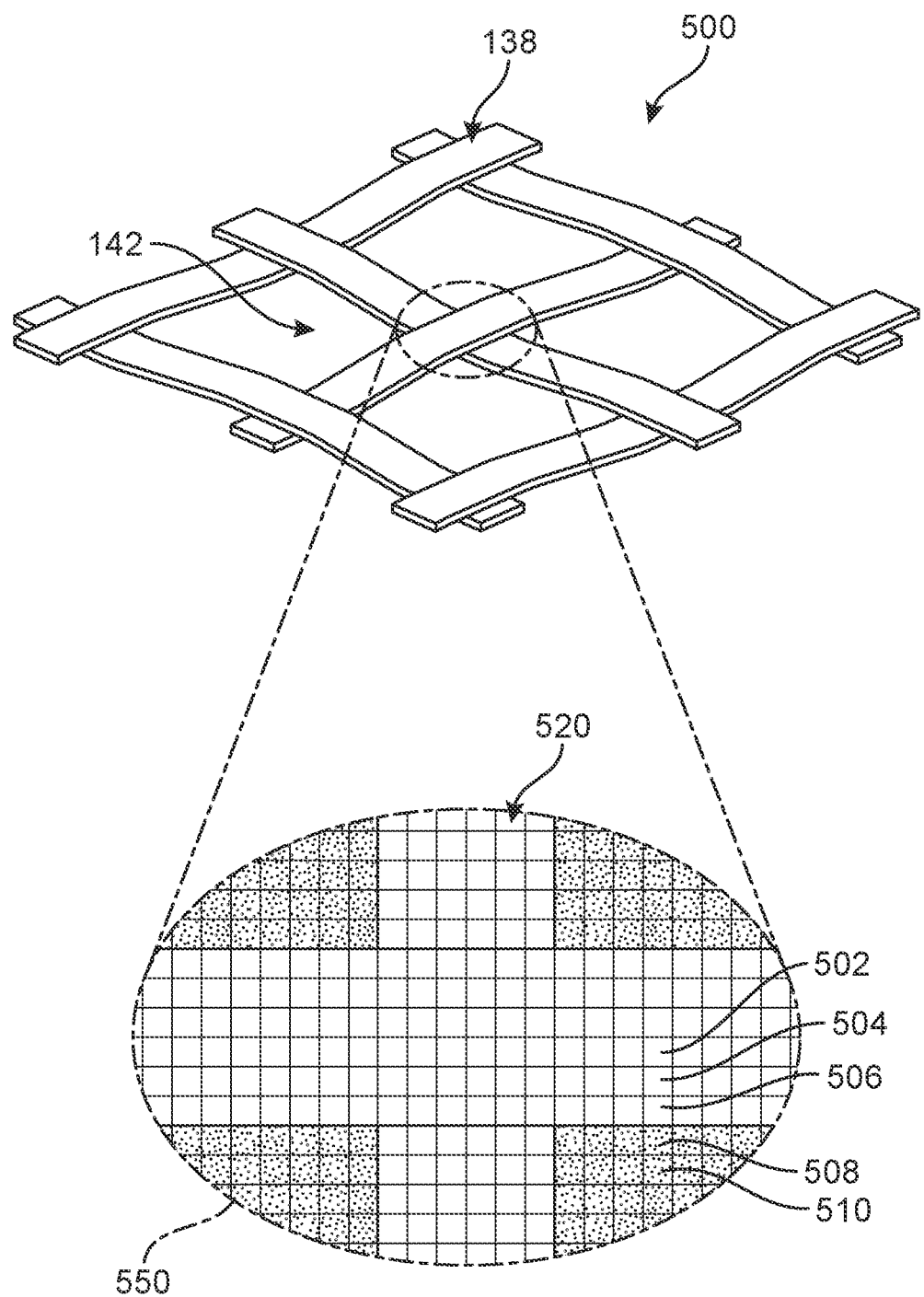
FIG. 5 is a isometric view of an embodiment of an article and a digital representation of the article.

The computing system 104 may generate a processed image 410 or virtual representation, which in some embodiments may be used to generate a virtual mask (discussed further with reference to FIGS. 5 and 6). The regions may be classified as either "print areas" 438 or "no-print areas" 442 in one embodiment. For purposes of this description, print areas 438 may represent portions of the object upon which printing is to be permitted (i.e., a printable area), and no-print areas 442 represent portions of the object upon which printing is to be excluded. In other words, no-print areas are areas prohibited from printing. It should be understood that in some cases, there may not be any print areas 438 identified, and in other cases, there may not be any no-print areas 442 identified. As illustrated in FIG. 4, each of no-print areas 438 in processed image 410 can correspond to each of apertures 142 in initial image capture 489 in some embodiments. In other embodiments, each of print areas 438 can correspond to each of tangible portions 138. In other words, the printing system as described herein may include provisions for detecting areas where printing may occur, and areas where printing should not occur, and adjust the output of nozzle 118 (not shown) accordingly.

It should be understood that the areas designated as no-print may be manually entered by a user, or may be programmed or otherwise provided to computing system 104 such that the designation may occur in an automated fashion. Furthermore, the discrimination process and/or the generation of a virtual mask may occur in real-time (i.e., during printing or after print material has been discharged) or it may be generated prior to printing.

FIGS. 5 and 6 depict one embodiment of the operation of the image discrimination process. In FIG. 5, sensor system 190 (not shown) has captured a digitized image 550 of a portion of article 500. For purposes of this disclosure, digitization may refer to the process of converting an image into a digital form that can be processed by a computing system. Thus, in some embodiments, sensor system 190 can capture an image of article 500 and divide the total picture area into rows and columns comprising a large number of relatively tiny subareas. In the embodiment of FIGS. 5 and 6, this digital organization of numeric data will be referred to as pixels 520. Pixels 520 can contain the digital numeric red-green-blue (RGB) color data (numbers) of one portion of the image's surface area. In other words, a row and column array of pixels may be created by computing system 104 in some embodiments. As each pixel is generally stored as a color sampled from the frame area, pixels can be utilized by printing system 100 during the image discrimination process. It should be understood that RGB color identification is only an example of one means of digitally processing and/or storing the image data, and other processes may be used as known by persons skilled in the art.

Therefore, in some embodiments, an image file can be created by computing system 104, including three color values for every RGB pixel, or location, in the image grid of rows and columns. The data is also organized in the file in rows and columns. File formats may vary in different embodiments. Some examples include BMP, JPEG, GIF, PNG, TIFF, PICT, and other image file formats. The viewing software can then depict each location along one of the rows and along one of the columns in the grid of rows and columns. It should be understood that in some embodiments, the use of pixels implies the virtual construction of a "grid" of pixels that compose or comprise an image.

In FIG. 5, for purposes of illustration, an embodiment of a portion of a row of pixels 520 is identified, including a first pixel 502, a second pixel 504, a third pixel 506, a fourth pixel 508, and a fifth pixel 510. First pixel 502, second pixel 504, and third pixel 506 are associated with tangible portions 138. Fourth pixel 508 and fifth pixel 510 are associated with apertures 142. In some embodiment, each pixel corresponds to or represents a unique or specific location, area, or portion of article 500. Thus, in one embodiment, first pixel 502 can represent a first area on article 500, and second pixel 504 can represent a second area on article 500, such that the first area and the second area are different.

In FIG. 6, a matrix is illustrated, listing the pixels identified in FIG. 5, each pixel's location in the digitized image, the color value assigned to the pixel, as well as the resulting classification of the pixel to either a print area (yes) or a no-print area (no). It should be understood that the matrix including the pixel number, values of the location of each pixel, the color value, and the classification to a print area or no-print area is provided as an example only, and that values other than those included in FIG. 6 may be listed in the matrix.

As shown in FIG. 6, first pixel 502, second pixel 504, and third pixel 506 have been designated or classified as print areas, and fourth pixel 508 and fifth pixel 510 have been designated or classified as no-print areas. As a result of this classification, a virtual mask may be generated by computing system 104. In one embodiment, the virtual mask may be superimposed on the processed or digitized image or be otherwise applied to the original data regarding the object. For purposes of this disclosure, a virtual mask may be a simulated or digital mask, and may not physically exist. The virtual mask can substantially "block" portions of an image in some embodiments. In one embodiment, the virtual mask can include a shape or outline that substantially corresponds to the shape of the digitized image, while any regions identified and classified to the no-print areas are filled with a type of limiting content, such as a uniform pre-selected color or other graphics. In some embodiments, the virtual mask may be automatically generated during the image discrimination process. However, in other embodiments, the virtual mask may be superimposed on the digitized image by a user.

For example, the virtual mask may fill or otherwise superimpose on the region of the no-print areas in the processed image a color or pattern that will be light absorbing color (e.g., black), or any other specialized pattern, such that the printing system interprets or otherwise is instructed to avoid printing in the no-print area, regardless of the print design. In one embodiment, the use of virtual masks can avoid printing on regions of tray 112 (not shown) or other surfaces that do not require printing. Printing resources can thus be conserved, printing may be more efficient, clean-up of print areas may be minimized, print bleeding can be decreased, and/or image or print results can be optimized in some embodiments.

Figure 7:
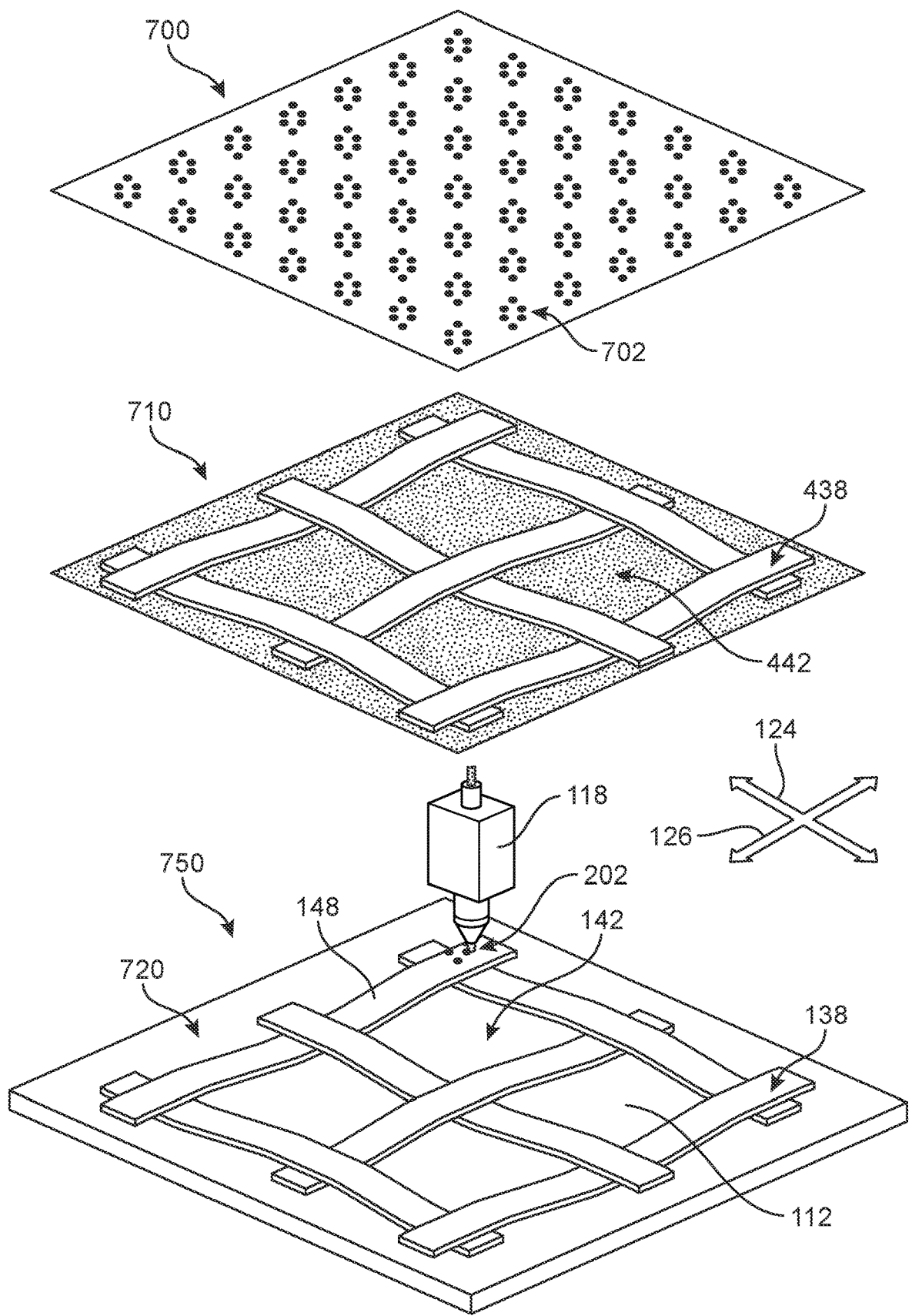
FIG. 7 is an isometric view of an embodiment of an article and a portion of a printing device, a processed image, and a print design.

FIGS. 7-10 illustrate an embodiment of the printing process that includes a virtual mask during 2D printing. In FIG. 7, an example of a print design 700 is shown. Print design 700 can be programmed, selected, uploaded, or otherwise inputted into printing system 100 during the printing process. As shown, print design 700 is a repeating pattern of round dots 702. In other embodiments, print design 700 may include any design, including 2D and 3D designs.

In some embodiments, the image capture process as discussed may produce a processed image 710 of a portion of an article 720. Processed image 710 includes print areas 438 and aperture regions 442. Thus, in one embodiment, processed image 710 may be used to form a virtual mask, which can be utilized by printing system 100 during printing to identify areas on which to avoid printing. As shown in FIG. 7, nozzle 118 has begun to deposit print material 202 along print surface 148. Article 720 includes apertures 142, and tangible portions 138. Printing system 100 may overlay or otherwise make reference to the virtual mask generated from processed image 710. In one embodiment, print surface 148 may be a surface of the substrate or material portions of article 720.

Figure 8:
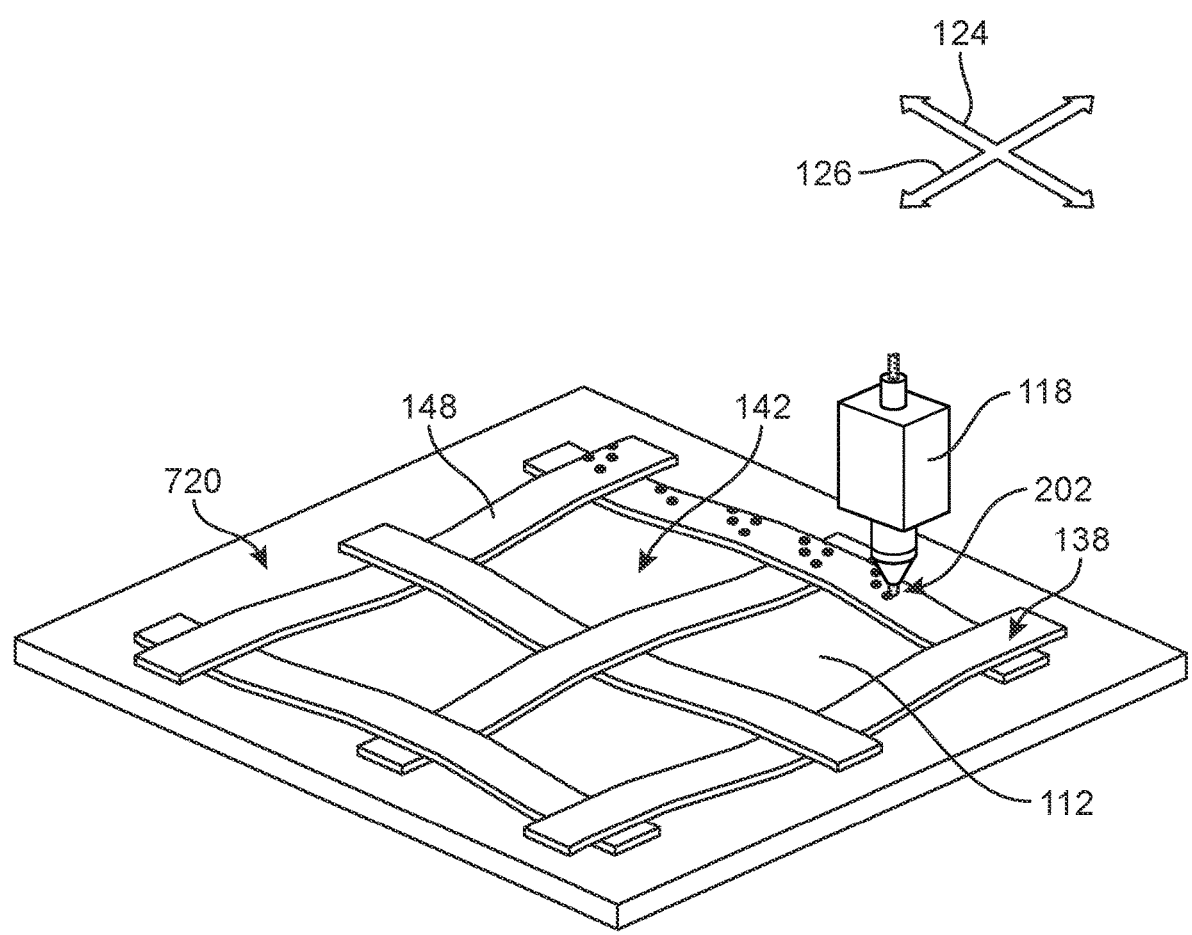
FIG. 8 is an isometric view of an embodiment of an article and a portion of a printing device.
Figure 9:
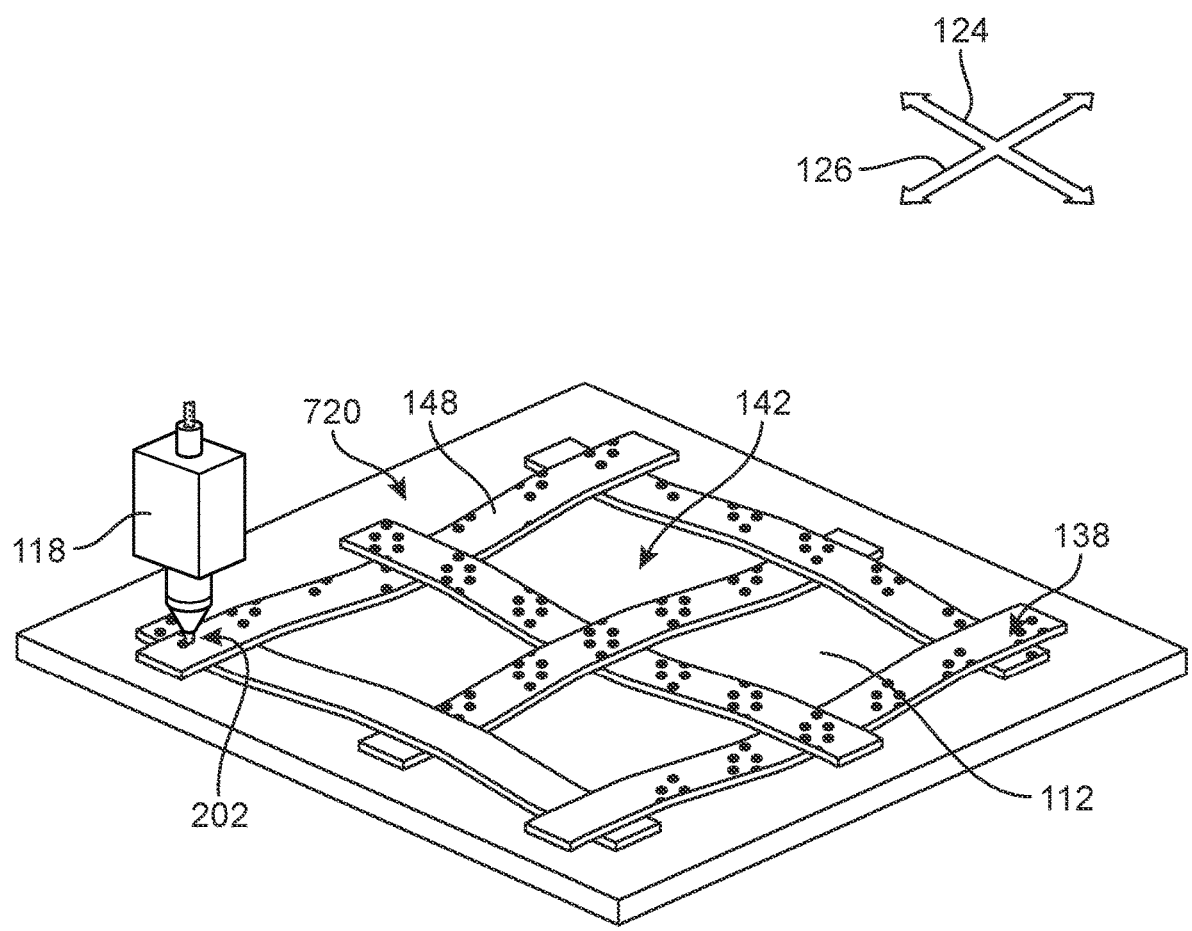
FIG. 9 is an isometric view of an embodiment of an article and a portion of a printing device.
Figure 10:
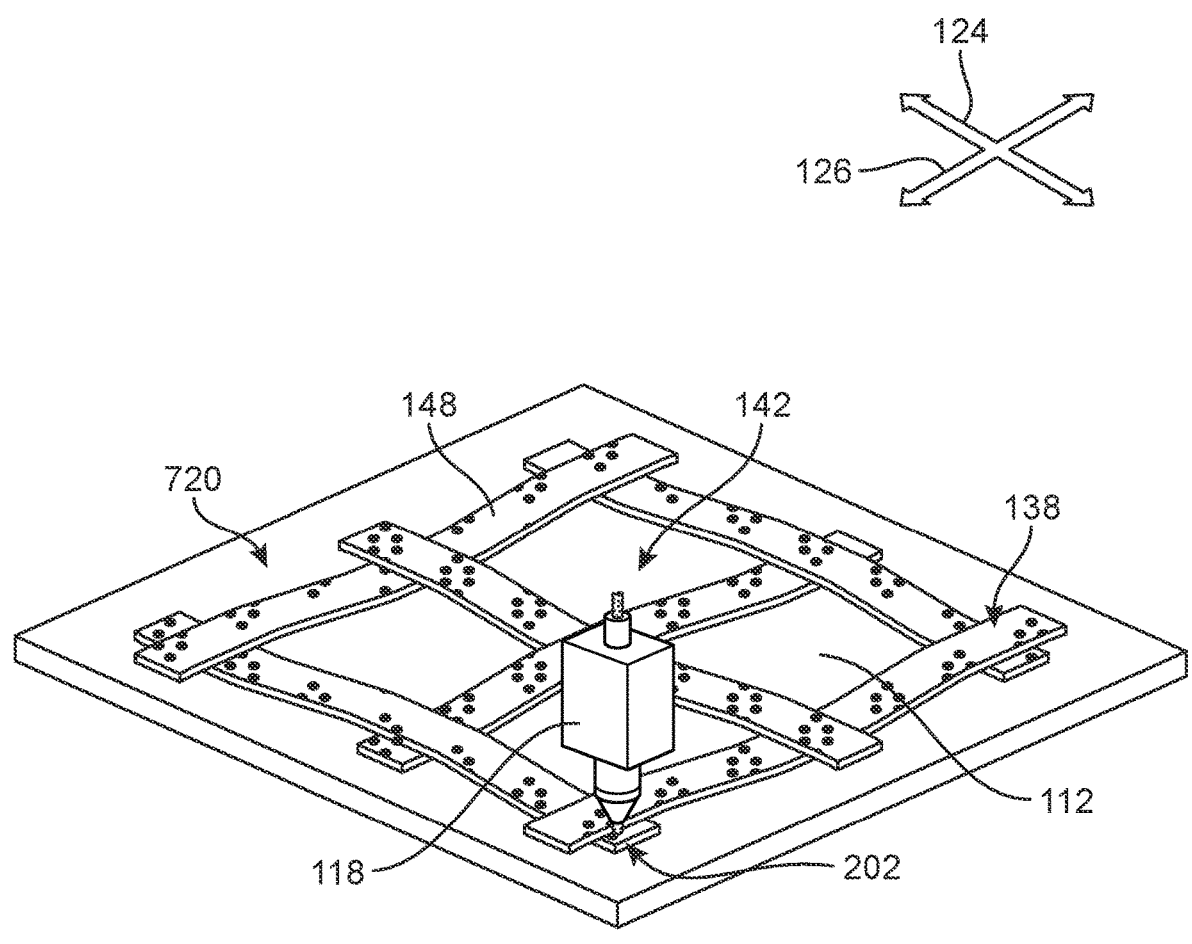
FIG. 10 is an isometric view of an embodiment of an article and a portion of a printing device.

In FIG. 8, nozzle 118 has moved along one side of article 720, in a generally longitudinal direction 124, depositing dots 702. As shown in FIG. 8, dots 702 are only deposited on print surface 148 that have been characterized as a print area (i.e., tangible portions 138). In other words, despite the inclusion of print design 700 shown in FIG. 7, which includes a continuous pattern of dots 702, printing of print design 700 is limited to the areas identified by printing system 100 as a print surface 148 or print area. This is further depicted in FIGS. 9 and 10. In FIG. 9, printing has occurred in both longitudinal direction 124 and lateral direction 126, across a majority of article 720. Printing on article 720 is being completed in FIG. 10. It can be seen that in both FIGS. 9 and 10, printing has been limited to regions identified as print areas (i.e., associated with tangible portions 138). Thus, in one embodiment, the areas of tray 112 associated with each of apertures 142 remain unprinted upon.

Figure 11:
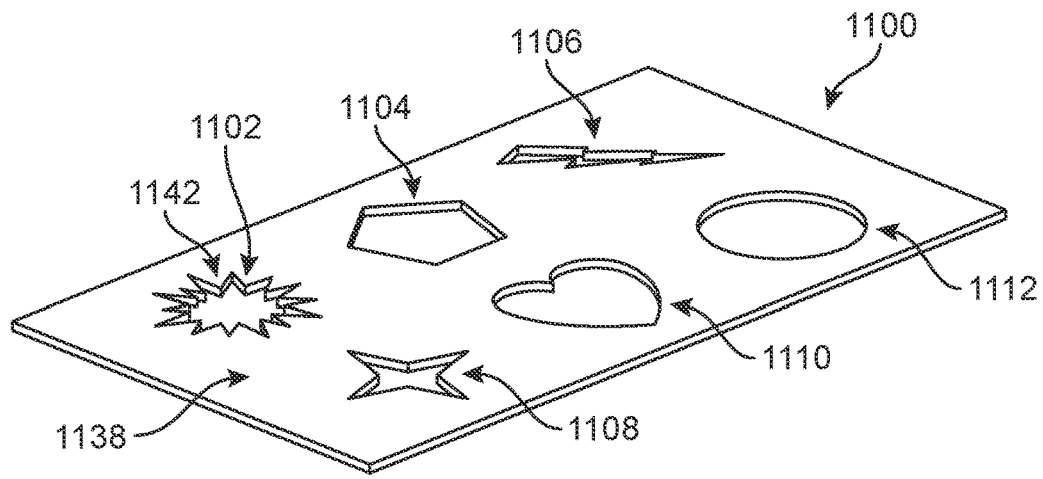
FIG. 11 is an isometric view of an embodiment of a textile.

FIGS. 11-15 depict another possible embodiment of the printing process as described herein. FIG. 11 is an embodiment of a textile 1100. Textile 1100 includes six apertures 1142 that are surrounded or bounded by tangible portions 1138. Apertures 1142 include a first aperture 1102, a second aperture 1104, a third aperture 1106, a fourth aperture 1108, a fifth aperture 1110, and a sixth aperture 1112. As shown in FIG. 11, each aperture may have a different shape and/or size. For example, first aperture 1102 is generally starburst shaped, second aperture 1104 is generally pentagonal shaped, third aperture 1106 is generally lightening shaped, fourth aperture 1108 is generally star shaped, fifth aperture 1110 is generally heart shaped, and sixth aperture 1112 is generally circular shaped. Thus, apertures 1142 may include sharp edges and/or curves, and a variety of geometries. In other embodiments, apertures 1142 may be larger or smaller than those depicted, and include other regular or irregular shapes.

Figure 12:
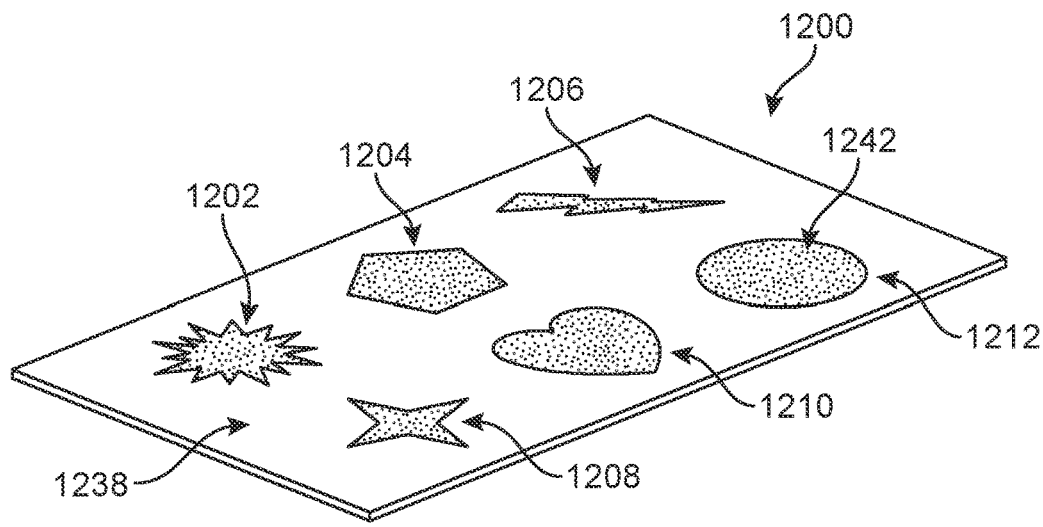
FIG. 12 is an embodiment of a digital representation of the textile of FIG. 11.

FIG. 12 is an embodiment of a processed image 1200 representing textile 1100 in FIG. 11. In FIG. 12, aperture regions 1242 and tangible regions 1238 are shown. Aperture regions 1242 include a first aperture region 1202, a second aperture region 1204, a third aperture region 1206, a fourth aperture region 1208, a fifth aperture region 1210, and a sixth aperture region 1212. As shown in FIGS. 11 and 12, first aperture 1102 in textile 1100 corresponds to first aperture region 1202 in processed image 1200. Similarly, second aperture 1104 corresponds to second aperture region 1204, third aperture 1106 corresponds to third aperture region 1206, fourth aperture 1108 corresponds to fourth aperture region 1208, fifth aperture 1110 corresponds to fifth aperture region 1210, and sixth aperture 1112 corresponds to sixth aperture region 1212. Thus, processed image 1200 may be a digital representation of specified areas of textile 1100 in some embodiments demarcating between print areas (associated with tangible regions 1238) and no-print areas (associated with aperture regions 1242).

In other words, when a print design is processed by printing system 100, the virtual mask generated (e.g., using processed image 1200) may be used to indicate or otherwise inform printing system which areas will not be printed upon. Thus, using this process, regardless of the actual print design employed, only the areas identified and targeted by the printing system as print areas will receive the print material.

Figure 13:
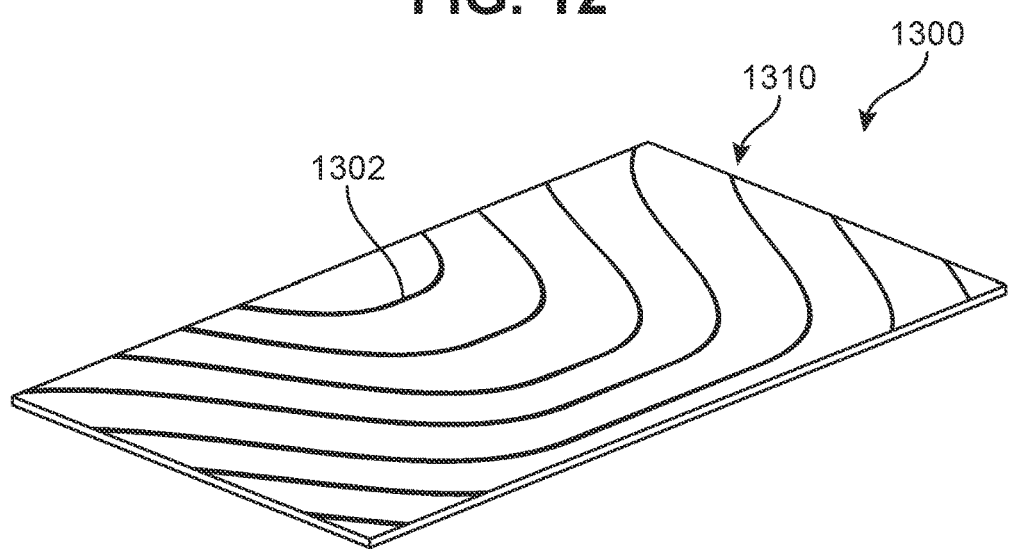
FIG. 13 is a schematic view of an embodiment of a print design.
Figure 14:
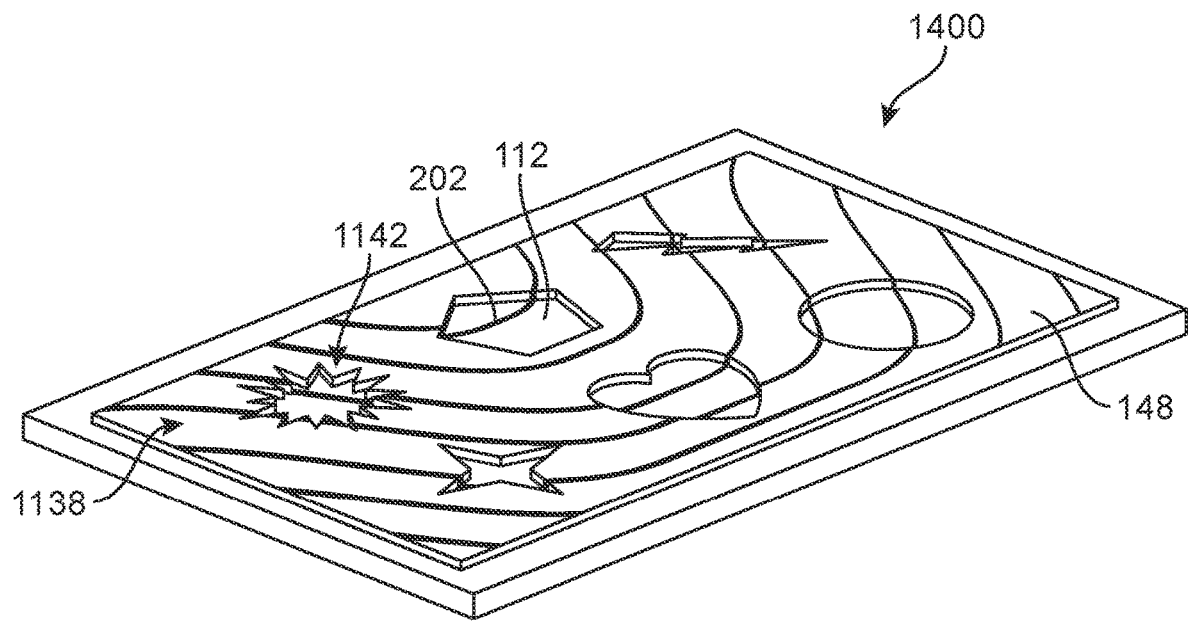
FIG. 14 is an isometric view an embodiment of a textile.
Figure 15:
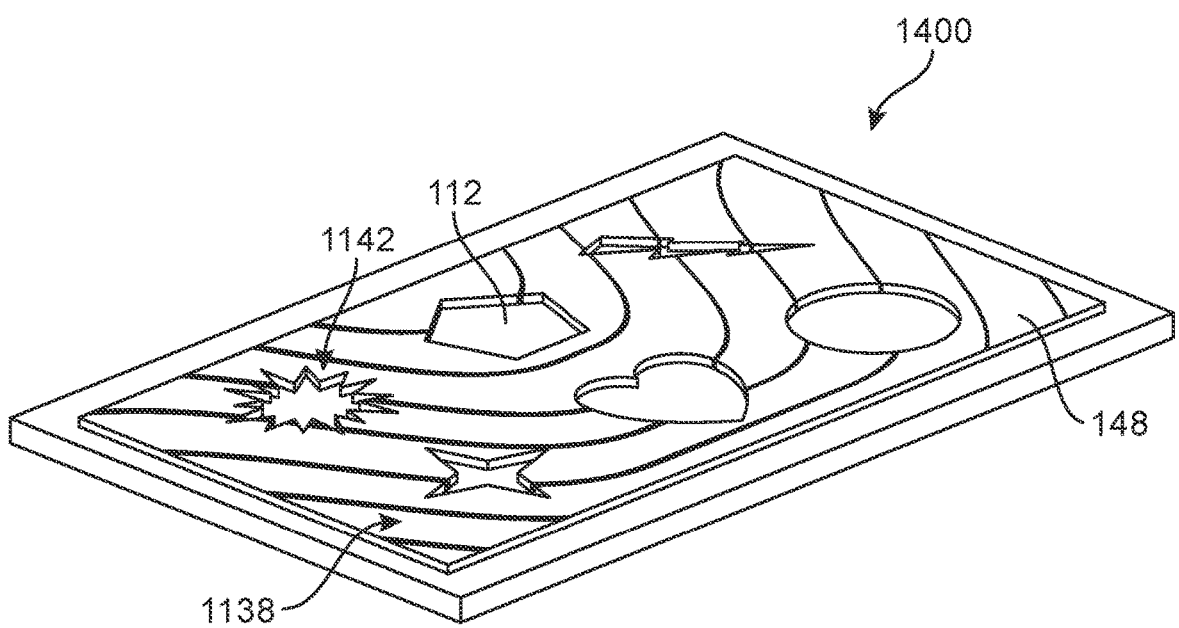
FIG. 15 is an isometric view an embodiment of a textile.

For example, in FIG. 13, a print design 1300 is shown. Print design 1300 includes a series of unbroken or continuous curves 1310 extending across the image. Print design 1300 includes curves 1310 of varying sizes, and curves 1310 that extend across various portions of the design area. In the embodiment of FIG. 13, curves 1310 include a first curve 1302.

To provide a comparison, in one example of a printing system that does not employ a virtual mask as described, print design 1300 of FIG. 13 may be printed on a surface without regard for the type of surface or for whether there is substrate actually present in the targeted print area. For example, in FIG. 14, an embodiment of a first printed textile 1400 is illustrated. Print design 1300 has been deposited on print surface 148. Print surface 148 includes the entire region bordered by the edges of first printed textile 1400, including the areas associated with both tangible portions 1138 and apertures 1142. Thus, in the example of FIG. 14, tray 112 may be a target for print material 202.

However, in embodiments that utilize a virtual mask, print design 1300 of FIG. 13 may be deposited such that tray 112 is no longer classified as a print surface. For example, in FIG. 15 (showing print design 1300 as modified by the virtual mask), as the information from the virtual mask is included in the printing process, specified areas have been blocked from printing. In other words, in some embodiments, apertures 1142 of a second printed textile 1500 are avoided or excluded, while tangible portions 1138 are printed upon. Thus, areas of tray 112 associated with the no-print zones (e.g., apertures 1142) remain clear of print material 202, while tangible portions 1138, representing print surface 148, include print material 202 generally matching the corresponding sections of print design 1300 (shown in FIG. 13).

The use of the virtual mask may allow or otherwise permit printing to occur more efficiently and decrease the overall cost (e.g., ink, clean-up, post-processing) of the printing process. Furthermore, the techniques described herein can permit the application of a variety of designs on a wide variety of articles, including articles with uneven surfaces, gaps, or other irregularities. For example, a desired print design need not be altered or adjusted to accommodate the type of print surface prior to printing, because only the surfaces classified as print zones will receive the print material. Additionally, post-manufacture customization of articles may be easier, as well as quicker.

Figure 16:
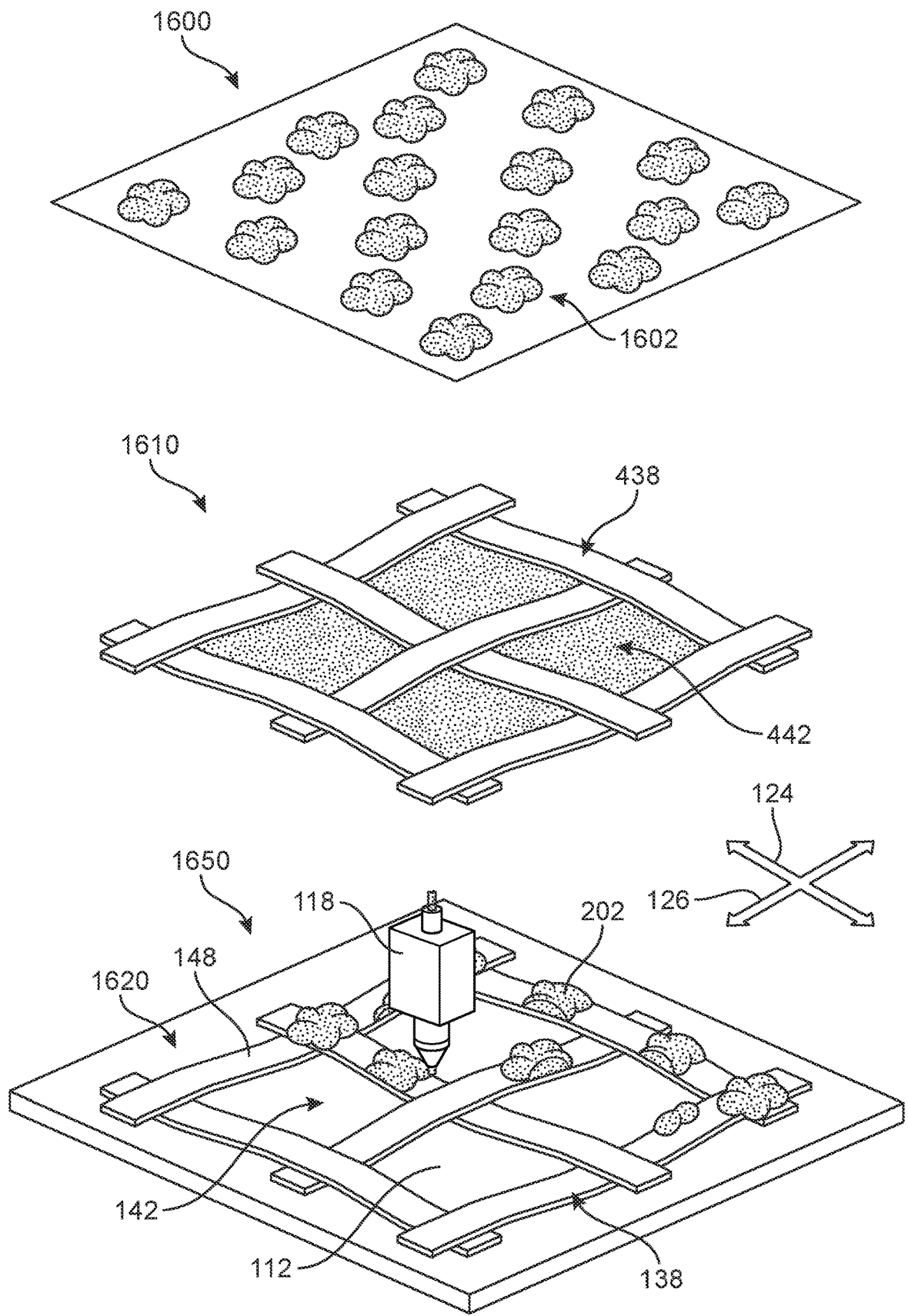
FIG. 16 is an isometric view of an embodiment of an article and a portion of a printing device, a processed image, and a print design.
Figure 17:
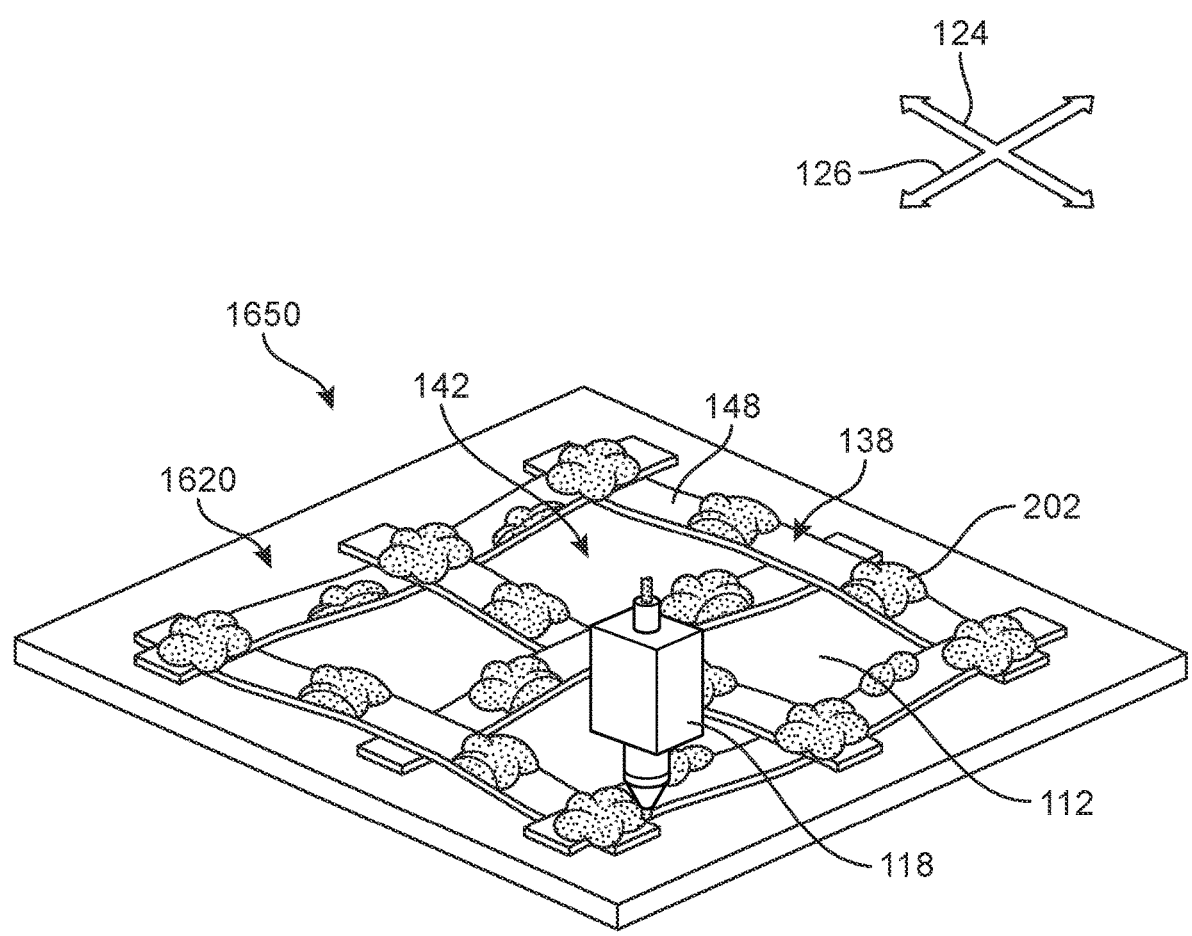
FIG. 17 is an isometric view of an embodiment of an article and a portion of a printing device.

The embodiments described herein can also be directed to 3D printing. FIGS. 16 and 17 illustrate an embodiment of the printing process that includes a virtual mask during 3D printing. In FIG. 16, an example of a print design 1600 is shown. Print design 1600 can be programmed, uploaded, or otherwise inputted into the printing system during the printing process. As shown, print design 1600 is a repeating pattern of cloud ornaments 1602. In other embodiments, print design 1600 may include any design, including 2D and 3D designs.

In some embodiments, the image capture process as discussed may produce a processed image 1610 of a portion of an article 1620. Processed image 1610 includes print areas 438 and aperture regions 442. Thus, in one embodiment, processed image 1610 may be used as a virtual mask, which can be utilized by printing system 100 during printing to identify areas on which to avoid printing. As shown in FIG. 16, nozzle 118 has begun to deposit three-dimensional print material 202 along print surface 148. In one embodiment, print surface 148 may comprise of the substrate of article 1620. Article 1620 includes apertures 142, and tangible portions 138. Printing system 100 may overlay or otherwise make reference to the virtual mask generated from processed image 1610.

In FIG. 17, nozzle 118 has moved along multiple sides of article 1620, depositing cloud ornaments 1602. Printing has occurred in both longitudinal direction 124 and lateral direction 126, across a majority of article 1620. As shown in FIG. 17, cloud ornaments 1602 are only deposited on tangible portions 138 that have been characterized as a print area. In other words, despite application of print design 1600 shown in FIG. 16, which includes a continuous pattern of cloud ornaments 1602, printing of the structures of print design 1600 is limited to the areas identified by printing system 100 as a print surface 148. It can be seen that in both FIGS. 16 and 17, printing has been limited to regions identified as print zones (i.e., associated with tangible portions 138). Thus, in one embodiment, the areas of tray 112 associated with each of apertures 142 remain unprinted upon.

Referring back to the various printing embodiments depicted in FIGS. 7-17, in some embodiments, it should be understood that print designs may be utilized by printing system 100 in different ways. In one embodiment, the print designs may be "mapped" to facilitate the virtual masking process. For purposes of this disclosure, mapping refers to an operation or process that associates each of the elements of a given set with one or more elements of a second set.

In some embodiments, selected print design 700, print design 1300, and/or print design 1600 may be stored or represented by a plurality or region of pixels (e.g., similar to the representation of digitized image 550 by pixels 520 in FIG. 5 above). To provide one example of a mapping process, the selected print design may include a first section represented by a first set of pixels, and a second section represented by a second set of pixels. Similarly, the digitized image can also include two sets of pixels, for example, a third set of pixels and a fourth set of pixels.

In some embodiments, each pixel in the first set of pixels from the print design can be mapped (associated) with each pixel in the third set of pixels from the digitized image. Furthermore, each pixel in the second set of pixels from the print design can be mapped (associated) with each pixel in the fourth set of pixels from the digitized image. Thus, in one embodiment, the pixels representing the print design can be linked or correlated to the pixels representing the digitized image. In some cases, this linkage can occur by determining the mapping relationship between each of the sets of pixels, such that the grid of pixels representing the digitized image and the grid of pixels representing the print design are matched and/or spatially correlated.

To determine the mapping between the digitized image and the print design, a bitmap or pixmap of the print design and/or digitized image may be generated. For purpose of this disclosure, a bitmap or pixmap is a type of memory organization or image file format used to store digital images, and may refer to the concept of a spatially mapped array of pixels. The mapping process may also utilize raster images, whether synthetic or photographic, in files or memory.

In one case, utilizing the masking methods described herein, the first section of the print design may then be printed onto the article when the third set of pixels are all classified in the "print areas" category, and the second section of the print design can be prevented from being printed onto the article (or areas associated with the article) when the fourth set of pixels are classified in the "no-print areas" category. In another case, the first section of the print design may be prevented from being printed onto the article (or areas associated with the article) when the third set of pixels are all classified in the "no-print areas" category, and the second section of the print design can be printed onto the article when the fourth set of pixels are classified in the "print areas" category.

Figure 18:
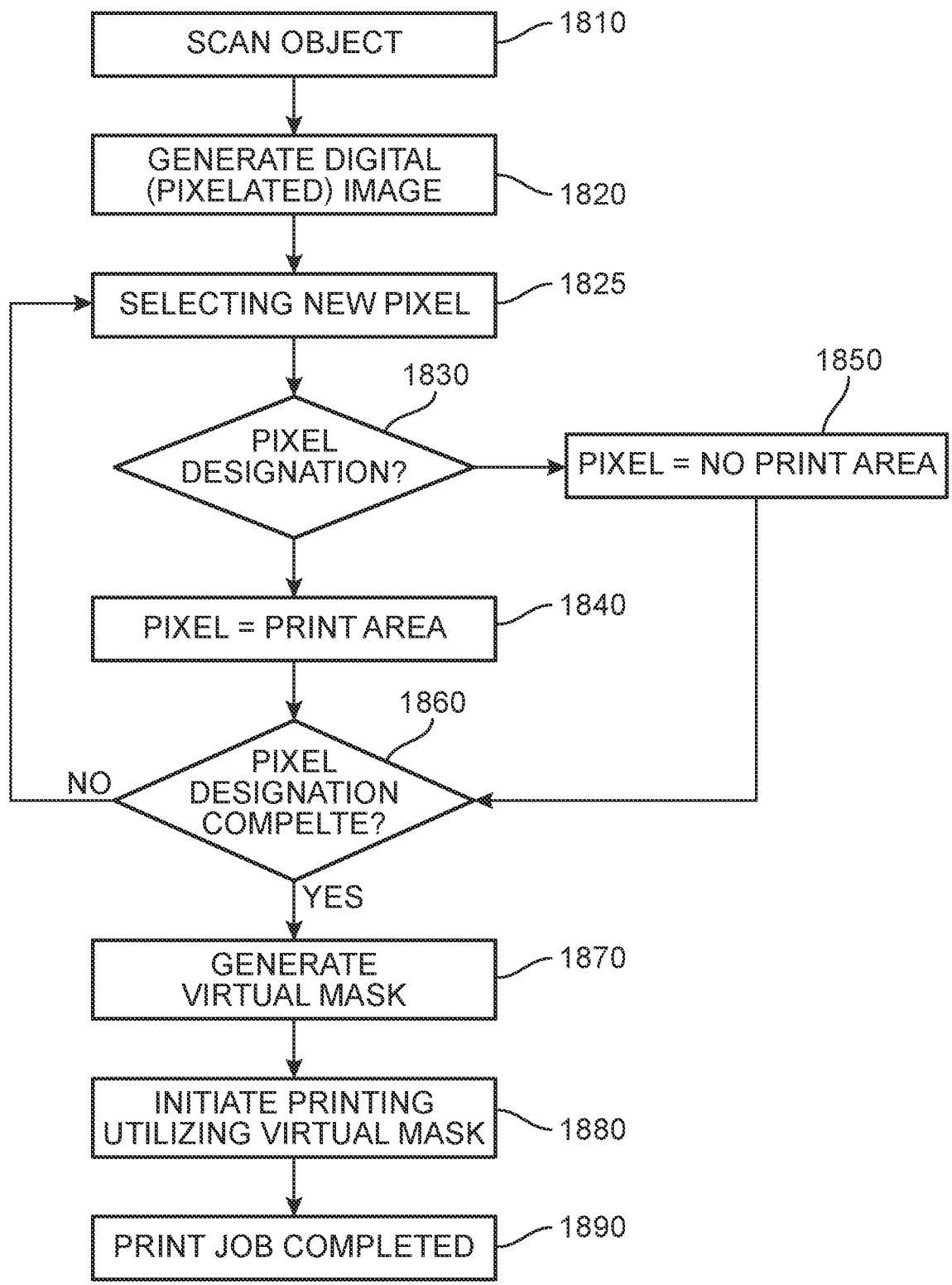
FIG. 18 is a flow diagram outlining the steps of an embodiment of the printing process.

One embodiment of the printing process as described herein is outlined in the flow chart of FIG. 18. An object or article located within the housing may be scanned or data regarding the article may be otherwise obtained (for example, using the sensor system described above) in a first step 1810. In a second step 1820, the scanned information may be used by the computing system to generate a digital (pixelated) image. In some embodiments, each pixel may represent a specific area of the article. In a third step 1825, a pixel is selected for examination. In a fourth step 1830, one pixel is examined and assigned or classified as either a print area or print zone in a fifth step 1840, or as a no-print area or print zone in a sixth step 1850. In other words, the pixel may be classified in one of at least two categories, where the first category is associated with allowing printing to occur, and where the second category is associated with the exclusion of any printing. Sixth step 1850 may occur in conjunction with the software (e.g., edge detection or classification) of the computing system in some embodiments. In a seventh step 1860, the printing system determines if any pixels remain unexamined. If there is at least one additional pixel remaining, the process returns to third step 1825. If no pixels remain, a virtual mask is generated in an eighth step 1870. In a ninth step 1880, printing is initiated which utilizes the virtual mask generated in eighth step 1870. The virtual mask may be superimposed on the digital image originally generated in second step 1820 in some embodiments. The print job is completed in a tenth step 1890, where the virtual mask can be used to exclude some areas of the article from receiving printed material.

As mentioned above, the processes described herein may occur in real-time in some embodiments. For purposes of this description, a real-time virtual mask process may occur when one or more of the pixels representing the object are classified after printing has begun (i.e., some of the print material has been discharged before all pixels have been classified). A general outline of an embodiment of a real-time virtual mask printing process is provided in the flow diagram of FIG. 19. It should be understood that there may be additional steps in other embodiments, or the steps may differ from those listed in FIG. 19 in some embodiments.

Before printing, a print design may be selected in a first step 1910. An object or article located within the housing may then be scanned or data regarding the article may be otherwise obtained (for example, using the sensor system described above) in a second step 1920. In a third step 1930, the data may be used by the computing system to generate or render a digital (pixelated) image. In some embodiments, each pixel may represent a specific area of the article. In a fourth step 1935, a pixel is selected for examination. It should be understood that in some embodiments, the pixel selected is identified with an area of the object that will be printed on, allowing the system to perform and apply a virtual mask in substantially real-time. In a fifth step 1940, one pixel is examined and assigned or classified as either a print area or print zone in a sixth step 1950, or as a no-print area or no-print zone in a seventh step 1960. In other words, the pixel may be classified in one of at least two categories, where the first category is associated with allowing printing to occur, and where the second category is associated with the exclusion of any printing. Seventh step 1960 may occur in conjunction with the software (e.g., edge detection or classification) of the computing system in some embodiments. If the pixel is designated as a print area, print material may be deposited on the region of the article associated with the pixel in an eighth step 1970. Thus, printing may occur in real-time in some embodiments, as the pixels that are classified for printing receive the print material soon after the designation. Furthermore, if the pixel is designated as a no-print area, printing will be excluded from the region of the article associated with the pixel in a ninth step 1980. In a tenth step 1990, printing system determines if any pixels remain to be examined. If there is an additional pixel, the process returns to fourth step 1935. If no pixels remain, the print job is completed in an eleventh step 1992.

Figure 19:
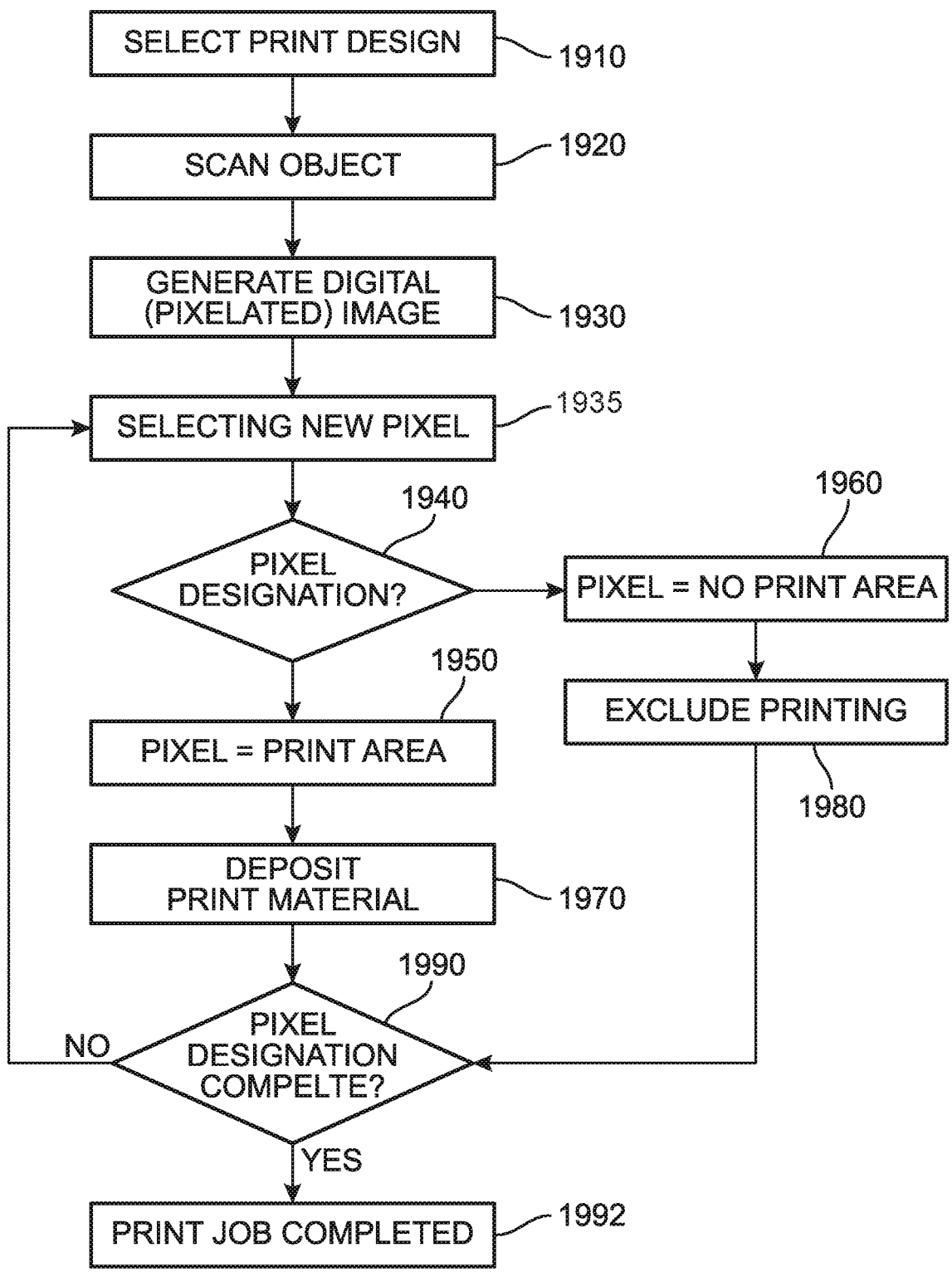
FIG. 19 is a flow diagram outlining the steps of an embodiment of the printing process.

It should be understood that in other embodiments, the generation of a virtual mask may be based on data other than pixels. For example, the software used may designate the various aspects or features of an object using other samples, representations, and/or data collected of the object. It should further be understood that the steps listed in the flow charts of FIGS. 3, 18, and 19 are not intended to be comprehensive and are provided as possible embodiments of the printing process. In other words, the process may also incorporate any of the other techniques described herein, as well as others practiced by those skilled in the art.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

I claim:

1. A method of printing on an article, the method comprising:
    imaging a surface of the article with a sensor system and generating a digital representation of the article;
    applying an edge detection process to the digital representation to identify a presence of different surface types, the different surfaces types comprising at least a first surface type and a second surface type;
    receiving a print design for the article; and
    processing the digital representation to designate one or more print areas for the first surface type and to designate one or more no-print areas for the second surface type;
    wherein the one or more print areas designate areas on the surface of the article upon which printing of the print design is permitted, and the one or more no-print areas designate areas on the surface of the article upon which printing of the print design is not permitted.

2. The method of claim 1, wherein the processing of the digital representation to designate one or more print areas for the first surface type and to designate one or more no-print areas for the second surface type comprises:
    selecting a pixel in the digital representation and designating the pixel as the one or more print areas or designating the pixel as the one or more no-print areas, and repeating this step for each pixel of the digital representation.

3. The method of claim 1, wherein the second surface type comprises apertures.

4. The method of claim 3, wherein the apertures comprise voids, spaces, or gaps in the surface of the article.

5. The method of claim 3, wherein the apertures comprise recesses in the surface of the article.

6. The method of claim 1, wherein the sensor system comprises an image capture device.

7. The method of claim 1, wherein the sensor system comprises a plurality of image capture devices.

8. The method of claim 7, wherein the digital representation is a composite image that is synthesized from data captured by the plurality of image capture devices.

9. The method of claim 7, wherein the digitized representation is formed by synthesizing data from the plurality of image capture devices through an image registration process.

10. The method of claim 1, wherein the article is received on a surface of a print system.

11. The method of claim 10, wherein the surface of the print system comprises a tray that supports the article during digitized image formation and printing.

12. The method of claim 11, further comprising:
    printing, with the print system, portions of the print design that correspond only to the one or more print areas on the article.

13. The method of claim 12, wherein the print system comprises a nozzle assembly and the tray is moveable relative to the nozzle assembly.

14. The method of claim 13, further comprising:
    translating the tray in a horizontal and/or vertical direction during printing.

15. The method of claim 1, wherein the article is a knit structure.

16. The method of claim 1, wherein the article is an article of footwear.

17. An apparatus for printing on an article, the apparatus comprising:
    a sensor system including one or more image capture devices configured to generate a digital representation a surface of the article; and
    a computing system, the computing system configured to apply an edge detection process to the digital representation to identify the presence of different surface types, the different surfaces types comprising at least a first surface type and a second surface type;
    wherein the computing system is configured to process the digital representation to designate one or more print areas for the first surface type and to designate one or more no-print areas for the second surface type; and
    wherein the one or more print areas designate areas on the surface of the article upon which printing is permitted, and the one or more no-print areas designate areas on the surface of the article upon which printing is not permitted.

18. The apparatus of claim 17, further comprising:
    a housing, the housing including a surface configured to receive the article;
    a printing device including a nozzle assembly configured to discharge a print material;
    wherein the computing system is further configured to receive a print design for the article and instruct the printing device to print portions of the print design that are correspond to the one or more print areas in the digital representation and exclude portions of the print design that correspond to the one or more no-print areas in the digital representation.

19. The apparatus of claim 18, wherein the second surface type comprises apertures.

20. The apparatus of claim 19, wherein the apertures comprise voids, spaces, or gaps in the surface of the article, and the article is an article of footwear.

* * * * *